US010739139B1

(12) United States Patent
LeGrand, III et al.

(10) Patent No.: US 10,739,139 B1
(45) Date of Patent: Aug. 11, 2020

(54) CALCULATING MOMENT OF INERTIA TENSORS OF AERIAL VEHICLES

(71) Applicant: Amazon Technologies, Inc., Seattle, WA (US)

(72) Inventors: Louis Leroi LeGrand, III, Seattle, WA (US); Benjamin Griffin Novak, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 15/882,684

(22) Filed: Jan. 29, 2018

(51) Int. Cl.
| G01C 21/16 | (2006.01) |
| G01P 15/18 | (2013.01) |
| G01C 19/00 | (2013.01) |
| B64G 1/28 | (2006.01) |
| B64C 39/02 | (2006.01) |
| G05D 1/08 | (2006.01) |

(52) U.S. Cl.
CPC .............. *G01C 21/16* (2013.01); *G01C 19/00* (2013.01); *G01P 15/18* (2013.01); *B64C 39/024* (2013.01); *B64C 2201/141* (2013.01); *B64G 1/288* (2013.01); *G05D 1/0808* (2013.01)

(58) Field of Classification Search
CPC ......... G01C 21/16; G01C 21/00; G01P 15/18; B64C 39/024; B64C 2201/141; B64G 1/288; G05D 1/0808
See application file for complete search history.

(56) References Cited

U.S. PATENT DOCUMENTS

| 6,408,321 B1 * | 6/2002 | Platt ..................... G06K 9/6234 702/19 |
| 2018/0115716 A1 * | 4/2018 | Gubler ............... H04N 5/23287 |

OTHER PUBLICATIONS

Michael Koken, The Experimental Determination of the Moment, of Inertia of a Model Airplane, Dec. 26, 2017, https://pdfs.semanticscholar.org/cc93/b91be41ea9585e46030968b3f83d95f85d4a.pdf (Year: 2017).*
NASA Armstrong Flight Research Center, X-56 Moment of Inertia Tests Dec. 28, 2016, https://www.youtube.com/watch?v=7xQJ2sVQrUA (Year: 2016).*
Matija Krznar. On-Line Inertia Measurement of Unmanned Aerial Vehicles Using On-Board Sensors and Bifilar Pendulum (Year: 2017).*
Physics Stack Exchange, "Calculating the Moment of Inertia in Bifilar Pendulums," Stack Exchange, Inc., Copyright 2016 https://physics.stackexchange.com/questions/147452/calculating-the-moment-of-inertia-in-bifilar-pendulums (downloaded Dec. 2, 2016, by web.archive.org).

* cited by examiner

Primary Examiner — Mahmoud S Ismail
Assistant Examiner — Bakari Underwood
(74) Attorney, Agent, or Firm — Athorus, PLLC

(57) ABSTRACT

Moments of inertia for an object, such as an aerial vehicle, may be determined by suspending the object from at least two filars, or cables, that are aligned in parallel and of equal length. After imparting a rotation upon the object about a vertical axis, data regarding oscillations of the object may be captured using an inertial measurement unit associated with the object. The captured data may be used to calculate a moment of inertia about the vertical axis, and to determine a vector corresponding to the vertical axis. After suspending the object, imparting rotations to the object and capturing data with the object in a number of orientations, a moment of inertia tensor may be calculated about the object's prin- (Continued)

cipal axes based on the moments of inertia about vertical axes in such orientations and the vectors.

20 Claims, 15 Drawing Sheets

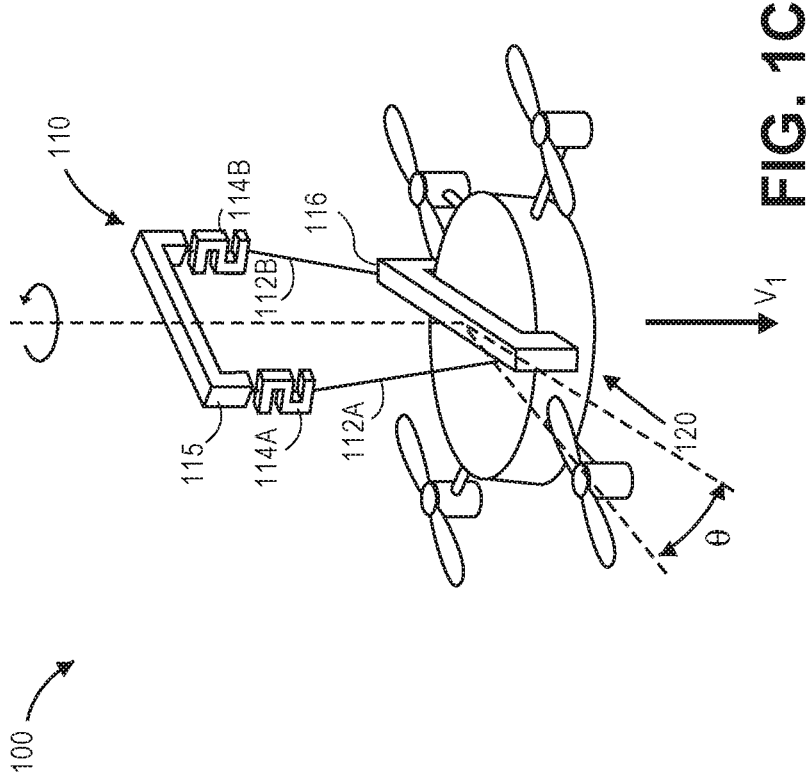

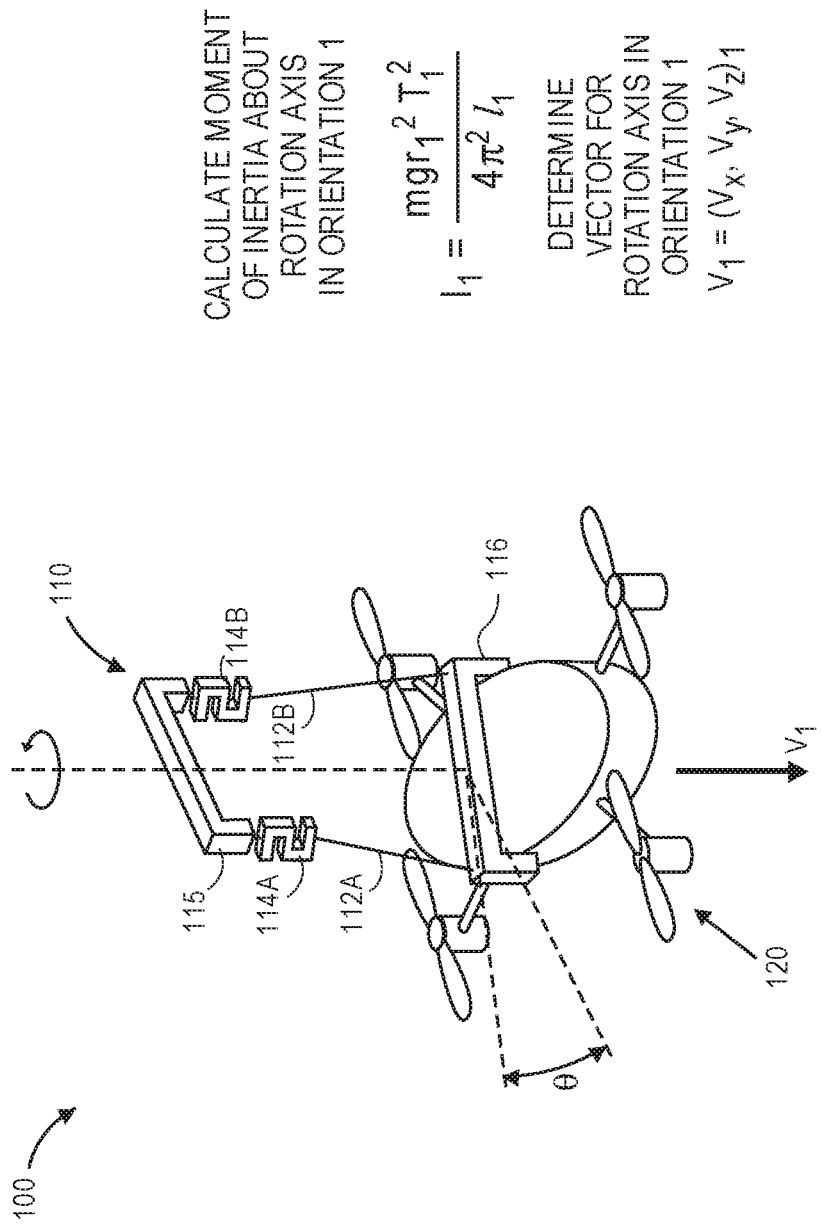

CALCULATE MOMENT OF INERTIA TENSOR I BASED ON
MOMENTS OF INERTIA AND VERTICAL AXIS VECTORS $$\begin{bmatrix} I_1 \\ I_2 \\ I_3 \\ I_4 \\ I_5 \\ I_6 \end{bmatrix} = \begin{bmatrix} v_{x1}^2 & v_{y1}^2 & v_{z1}^2 & 2v_{x1}v_{z1} & 2v_{x1}v_{y1} & 2v_{x1}v_{z1} \\ v_{x2}^2 & v_{y2}^2 & v_{z2}^2 & 2v_{x2}v_{z2} & 2v_{x2}v_{y2} & 2v_{x2}v_{z2} \\ v_{x3}^2 & v_{y3}^2 & v_{z3}^2 & 2v_{x3}v_{z3} & 2v_{x3}v_{y3} & 2v_{x3}v_{z3} \\ v_{x4}^2 & v_{y4}^2 & v_{z4}^2 & 2v_{x4}v_{z4} & 2v_{x4}v_{y4} & 2v_{x4}v_{z4} \\ v_{x5}^2 & v_{y5}^2 & v_{z5}^2 & 2v_{x5}v_{z5} & 2v_{x5}v_{y5} & 2v_{x5}v_{z5} \\ v_{x6}^2 & v_{y6}^2 & v_{z6}^2 & 2v_{x6}v_{z6} & 2v_{x6}v_{y6} & 2v_{x6}v_{z6} \end{bmatrix} \begin{bmatrix} I_{xx} \\ I_{yy} \\ I_{zz} \\ I_{xz} \\ I_{xy} \\ I_{yz} \end{bmatrix}$$

$$I = \begin{bmatrix} I_{xx} & I_{xy} & I_{xz} \\ I_{yx} & I_{yy} & I_{yz} \\ I_{zx} & I_{zy} & I_{zz} \end{bmatrix}$$

CALCULATING MOMENT OF INERTIA TENSORS OF AERIAL VEHICLES

BACKGROUND

The use of unmanned aerial vehicles ("UAV," or drones) such as airplanes or helicopters having one or more propellers in a variety of applications (e.g., surveillance, delivery, monitoring, law enforcement, security, mapping, or the like) is increasingly common. Such vehicles may include fixed-wing aircraft, or rotary wing aircraft or other vertical take-off and landing (or VTOL) aircraft having one or more propellers. In most unmanned aerial vehicles, each of the propellers is powered by one or more rotating motors or other prime movers. Additionally, most unmanned aerial vehicles are outfitted with inertial measurement units that measure linear and/or angular motion of the unmanned aerial vehicles, thereby enabling the unmanned aerial vehicle to calculate adjustments that may be necessary in order to maintain the unmanned aerial vehicle at a desired altitude, on a desired course or in a desired angular orientation.

Accurately determining moment of inertia values for an aerial vehicle can provide improved flight control capabilities. Unlike a solid body having a uniform mass distribution, an aerial vehicle is typically formed from a variety of different materials, and may feature asymmetric, irregular or uneven distributions. Therefore, determining moments of inertia of an aerial vehicle is typically a more challenging task than determining moments of inertia of a solid body having a uniform mass distribution, and commonly requires conducting one or more experiments, rather than calculating one or more values according to well-established equations.

Currently, one process for experimentally determining a moment of inertia of an object is a bifilar pendulum technique, or a bifilar suspension technique. In a typical bifilar pendulum technique, an object is suspended by a pair of parallel connectors, or filars, having substantially equal lengths. The object is then caused to oscillate about a vertical axis, e.g., as a torsional pendulum. A moment of inertia of the object about the vertical axis may be calculated as a function of lengths of the filars, a period of oscillation of the object, and a mass of the object. The process may be repeated any number of times, with the object in various orientations, in order to calculate values of moments of inertia about vertical axes with the object in the respective orientations.

When calculating moment of inertia tensors of aerial vehicles, typical bifilar pendulum techniques are plagued by a number of limitations. First, in order to determine moments of inertia about principal axes of an aerial vehicle, viz., a normal axis (or yaw axis), a lateral axis (or pitch axis), and a longitudinal axis (or roll axis) of the aerial vehicle, the aerial vehicle must be properly suspended in specific orientations such that the principal axes are respectively aligned along a vertical axis. In the event that the aerial vehicle is not properly oriented during a bifilar pendulum technique, e.g., with one of its axes aligned along the vertical axis about which the aerial vehicle oscillates, a moment of inertia calculated following the bifilar pendulum technique will not accurately reflect the true moment of inertia about that axis. Moreover, during a typical bifilar pendulum technique, a period of oscillation is typically measured by hand, e.g., using a stopwatch or other timing device. Inaccuracies in the timing of a period necessarily impact the accuracy of a moment of inertia calculated thereby.

BRIEF DESCRIPTION OF THE DRAWINGS

FIGS. 1A through 1G are views of aspects of one system for calculating a moment of inertia tensor in accordance with embodiments of the present disclosure.

DETAILED DESCRIPTION

As is set forth in greater detail below, the present disclosure is directed to determining moment of inertia tensors for aerial vehicles. More specifically, some embodiments of the systems and methods of the present disclosure are directed to suspending an aerial vehicle by two or more filars, imparting an initial torsional rotation about a vertical axis upon the aerial vehicle, and calculating a period of oscillation about the vertical axis using data gathered by an inertial measurement unit provided aboard the aerial vehicle. Using a mass of the aerial vehicle, a length of the filars, and a baseline separation between the filars, a moment of inertia may be calculated for the aerial vehicle about the vertical axis. After repeating the process a predetermined number of times, e.g., by reorienting the aerial vehicle in a predetermined number of orientations, imparting rotations upon the aerial vehicle in such orientations, and calculating periods of oscillation based on the data gathered by the inertial measurement unit, moments of inertia may be calculated for the aerial vehicle about the vertical axes with the aerial vehicle in each of such orientations. Subsequently, moments of inertia may be calculated within the coordinate frame of the inertial measurement unit, e.g., about the principal axes of the aerial vehicle, with the aerial vehicle in each of the orientations. In this regard, by relying on data gathered using inertial measurement units provided aboard aerial vehicles, the systems and methods of the present disclosure may be used to calculate moments of inertia for the aerial vehicles more accurately and efficiently than according to traditional bifilar pendulum techniques.

Figure 1A:
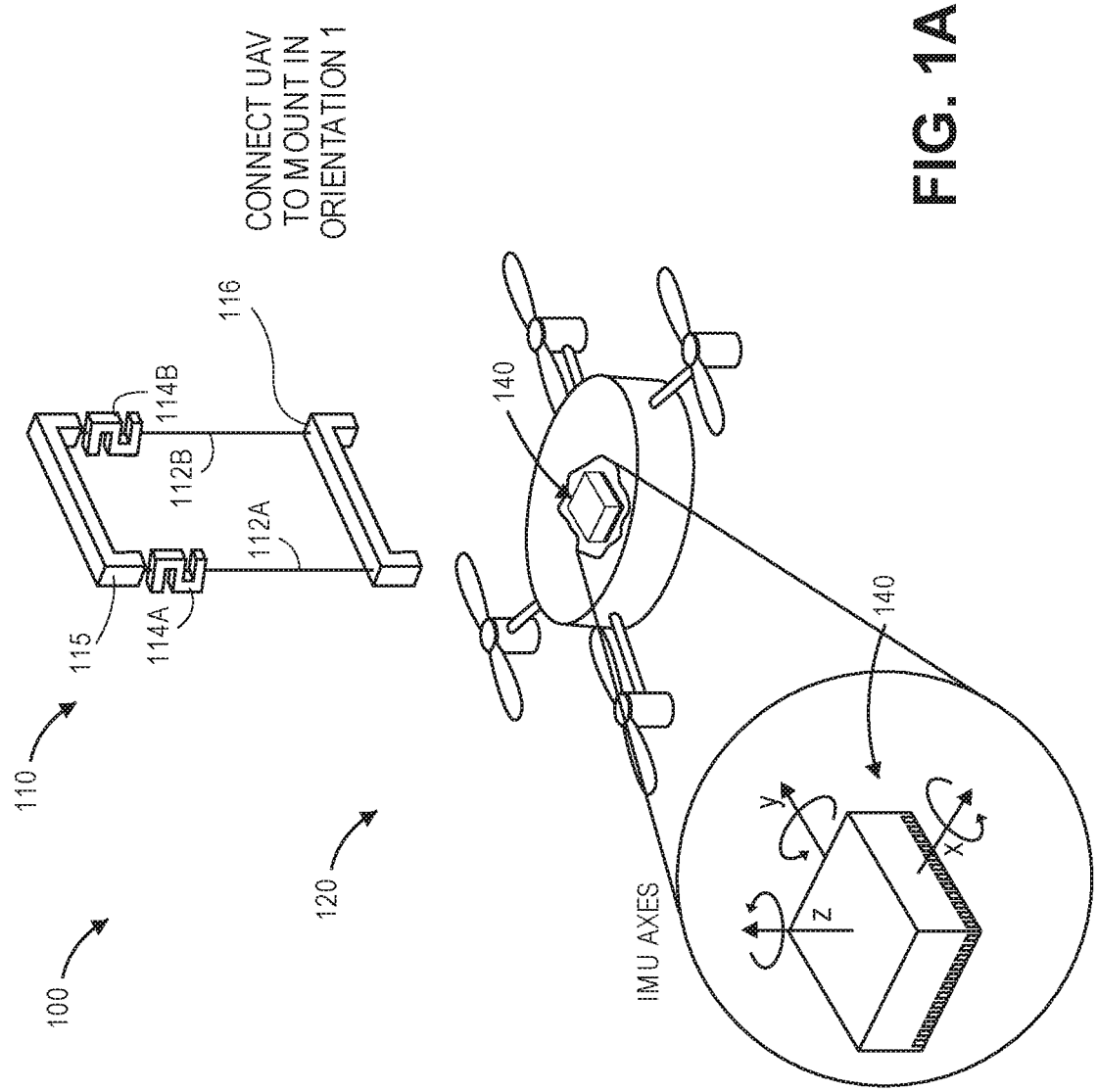

Referring to FIGS. 1A through 1G, views of aspects of one system 100 for calculating a moment of inertia tensor in accordance with embodiments of the present disclosure are shown. As is shown in FIG. 1A, the system 100 includes a testing unit 110 and an aerial vehicle 120. The testing unit 110 includes a pair of filars 112A, 112B, each of which has a first end and a second end. The first ends of the filars 112A, 112B are joined to a filar mount (or frame) 115 by way of a load cell (or load sensor) 114A, 114B. The load cells 114A, 114B are configured to measure forces acting upon each of the filars 112A, 112B. The second ends of the filars 112A, 112B are joined to a mounting unit 116. The filar mount 115 may be mounted to a ceiling or other stable surface within a testing facility (not shown), such that the mounting unit 116 and any objects releasably coupled thereto are suspended beneath the filar mount 115 by way of the filars 112A, 112B. In some embodiments, the first ends of the filars 112A, 112B may be connected directly to the filar mount 115, and the load cells 114A, 114B need not be provided.

The mounting unit 116 may be specifically or generally configured to releasably couple with one or more objects, such as the aerial vehicle 120, or any other objects, using one or more fastening or attachment mechanisms such as straps, bolts, pins, screws, clamps or others. In some embodiments, the first ends of the filars 112A, 112B may be separated from one another at the filar mount 115 by the same distance that the second ends of the filars 112A, 112B are separated from one another at the mounting unit 116, thereby ensuring that the filars 112A, 112B remain in parallel when the mounting unit 116 is suspended by the filars 112A, 112B. For example, in some embodiments, each of the filar mount 115 and the mounting unit 116 may have one or more adjustable components for ensuring that the first ends of the filars 112A, 112B are separated by the same distances as the second ends of the filars 112A, 112B regardless of the sizes or shapes of an object (e.g., the aerial vehicle 120) that may be coupled to the mounting unit 116.

The aerial vehicle 120 may be any type or form of aircraft, airship or other vehicle configured for travel by air, at least in part. For example, the aerial vehicle 120 may be intended to transport one or more persons and/or cargo over distances of any length, for any purpose, and may be adapted for manned operation, autonomous operation, or a combination of manned and/or autonomous operation. Alternatively, the mounting unit 116 may be configured to releasably couple with any type or form of object, e.g., by way of the mounting unit 116 of FIG. 1A or one or more other systems or components (not shown), including but not limited to vehicles.

As is shown in FIG. 1A, the aerial vehicle 120 is outfitted with an inertial measurement unit 140, which may be installed or embedded within a frame or one or more appurtenances of the aerial vehicle 120. The inertial measurement unit 140 may be provided in association with an inertial navigation system, a control system, or any other aspect or component of the aerial vehicle 120. For example, the inertial measurement unit 140 may be installed or mounted within the aerial vehicle 120 and configured to detect changes in linear or rotational motion of the aerial vehicle 120, e.g., by one or more gyroscopes, accelerometers and/or compasses provided therein.

As the aerial vehicle 120 oscillates about vertical axes in a number of orientations, data may be captured by the inertial measurement unit 140 and used to calculate moment of inertia values for the aerial vehicle 120 with respect to a coordinate frame of the inertial measurement unit 140, e.g., about an x-axis, a y-axis and a z-axis of the inertial measurement unit 140. In some embodiments, the inertial measurement unit 140 may be installed or mounted at or near (e.g., within a vicinity of) a center of gravity of the aerial vehicle 120. With the inertial measurement unit 140 installed at or near the center of gravity of the aerial vehicle 120, the coordinate frame of the inertial measurement unit 140 is consistent with the principal axes of the aerial vehicle 120. The inertial measurement unit 140 may thus be configured to detect changes in motion along one or more principal axes of the aerial vehicle 120, e.g., a normal axis (or yaw axis), a lateral axis (or pitch axis), and a longitudinal axis (or roll axis) of the aerial vehicle 120, or rotation about one or more of the principal axes of the aerial vehicle 120. Alternatively, the inertial measurement unit 140 may be mounted to one or more external surfaces of an object coupled to the mounting unit 116, e.g., an aerial vehicle, or any other objects such as the mounting unit 116 itself using one or more fastening or attachment mechanisms such as straps, bolts, pins, screws, clamps or others, and need not be installed or embedded within the object.

As is shown in FIG. 1A, the aerial vehicle 120 may be releasably coupled to the mounting unit 116 of the testing unit 110 in a first orientation, such that the aerial vehicle 120 is suspended beneath the filar mount 115, with the filars 112A, 112B in tension, by way of the mounting unit 116. In some embodiments, the mounting unit 116 may include one or more threaded, bolted or other releasable connectors for releasably coupling with corresponding aspects of one or more objects (e.g., the aerial vehicle 120), such as by male-female connections, or any other connections. In such embodiments, such connectors may further include one or more components for selecting an orientation of an object (e.g., the aerial vehicle 120) as the object is coupled to the mounting unit 116. Alternatively, the filars 112A, 112B may be coupled to a stable surface and/or the aerial vehicle 120 directly, and the use of either or both of the filar mount 115 or the mounting unit 116 need not be required. In such embodiments, the filars 112A, 112B and/or the aerial vehicle 120 may be directly and releasably coupled by way of one or more threaded, bolted or other releasable connectors, such as by male-female connections, in accordance with the present disclosure.

Figure 1B:
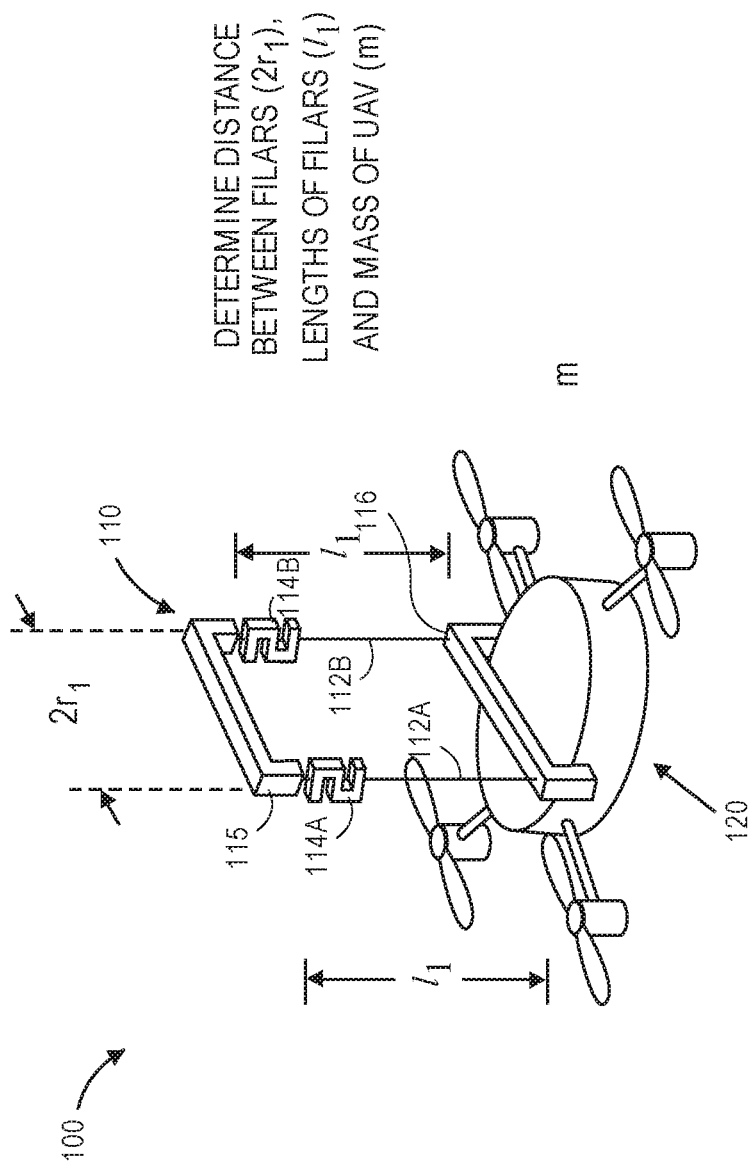

As is shown in FIG. 1B, after the aerial vehicle 120 is releasably coupled to the mounting unit 116 in the first orientation, a distance $2r_1$ between the filars 112A, 112B, as well as a common length $l_1$ of the filars 112A, 112B, and a mass m of the aerial vehicle 120 may be determined. For example, in some embodiments, the distance $2r_1$ and/or the common length $l_1$ may be determined by manually measurement, e.g., using a tape measure, a yard stick, or any other like system or device. In some other implementations, the filars 112A, 112B and/or the filar mount 115 or the mounting unit 116 may include one or more markings or other indicia of lengths thereof or distances therebetween, and the distance $2r_1$ and/or the common length $l_1$ may be determined by visual inspection of such markings or indicia, e.g., by a human and/or one or more sensors (such as one or more imaging devices). Alternatively, in still other implementations, the filars 112A, 112B, the filar mount 115 and/or the mounting unit 116 may include one or more automatic systems (e.g., sensors or other components) for automatically determining the distance $2r_1$ and/or the common length $l_1$. Likewise, in some embodiments, the mass m of the aerial vehicle 120 may be determined based on signals received from the load cells 114A, 114B, less any tare or other consideration for a mass of the mounting unit 116. Alternatively, in some embodiments, the mass m of the aerial vehicle 120 may be determined independently, e.g., prior to releasably coupling the aerial vehicle 120 to the mounting unit 116, and the load cells 114A, 114B need not be required.

As is shown in FIG. 1C, an initial rotation about a vertical axis $V_1$ may be imparted onto the aerial vehicle 120, e.g., by applying a force to a portion of the aerial vehicle 120 and/or the mounting unit 116. The force F causes the aerial vehicle 120 to rotate, e.g., in torsion, by an angle θ with respect to the vertical axis $V_1$. Upon removing the force F, the rotation of the aerial vehicle 120 will reverse in an opposite direction with respect to the vertical axis $V_1$, and the aerial vehicle 120 will begin to oscillate about the vertical axis $V_1$.

Figure 1D:
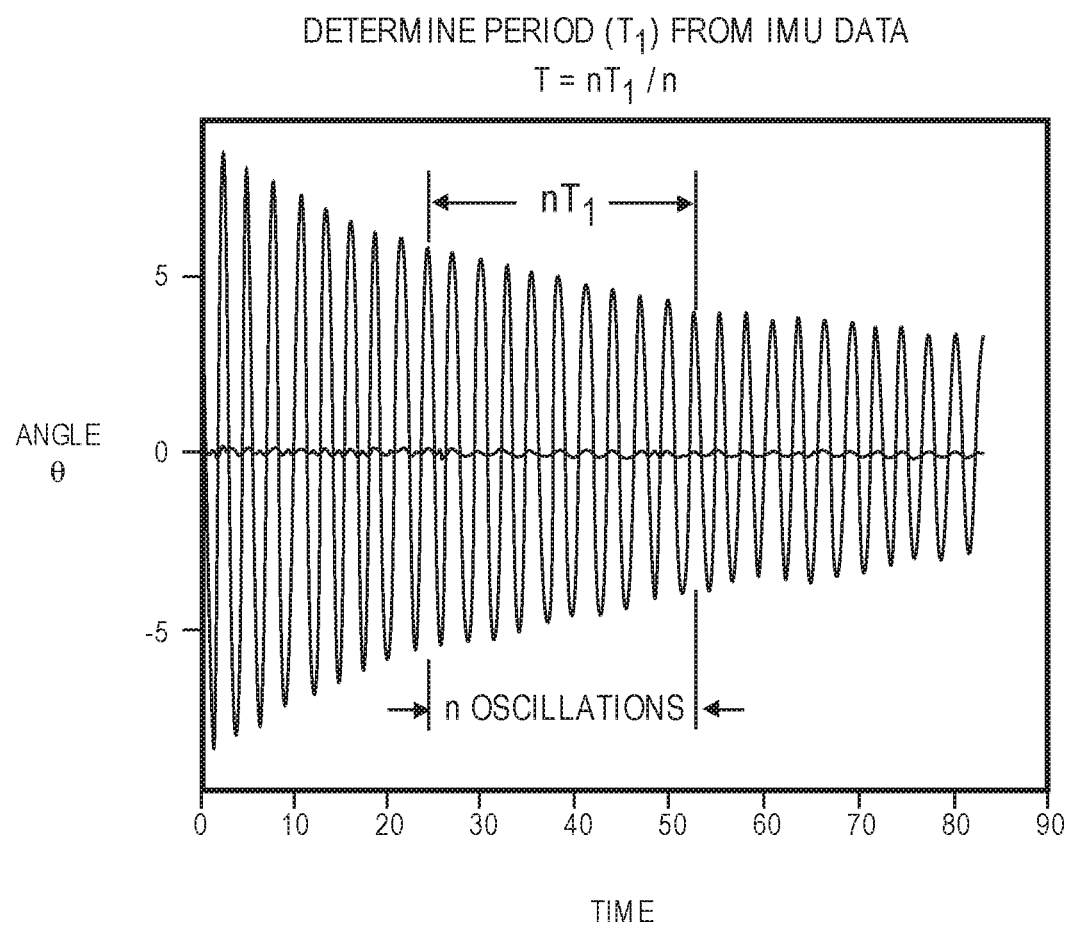

The oscillation of the aerial vehicle 120 about the vertical axis $V_1$ will continue in an alternating fashion, or sinusoidally, with a substantially constant frequency or period, and with dampening amplitudes. As is shown in FIG. 1D, during the rotation of the aerial vehicle 120, the inertial measurement unit 140 may capture data regarding the oscillation of the aerial vehicle 120 about the vertical axis $V_1$. After a predetermined number n of oscillations, a period of the oscillations, or $T_1$, may be calculated by determining a time $nT_1$ associated with the n oscillations, and dividing the time $nT_1$ by n.

As is shown in FIG. 1E, where the values of the angles θ of rotation are sufficiently small, a moment of inertia $I_1$ of the aerial vehicle 120 about the vertical axis may be calculated according to Equation (1), $$I_1 = mgr_1^2 T_1^2 / 4\pi^2 l_1 \qquad (1)$$

wherein m is the mass of the aerial vehicle 120, g is acceleration due to gravity, $r_1$ is one-half of the distance $2r_1$ between the filars 112A, 112B, $T_1$ is the period of oscillation, π is the constant pi, and $l_1$ is the common length of the filars 112A, 112B. Additionally, the inertial measurement unit 140 may also determine a vector in three-dimensional space corresponding to the vertical axis $V_1 = (V_X, V_y, V_z)_1$ about which the aerial vehicle 120 rotates, as is shown in FIG. 1E.

Figure 1F:
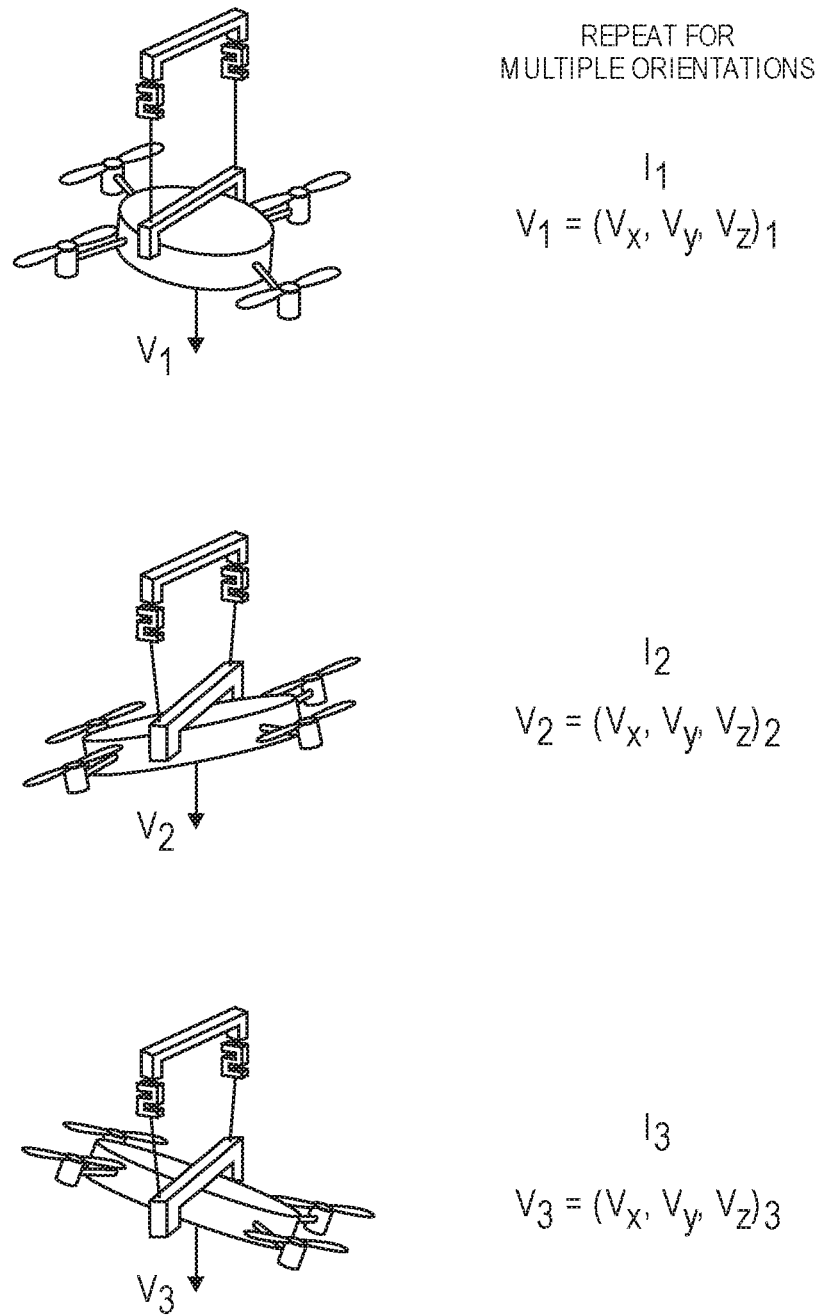

In accordance with the present disclosure, additional moments of inertia may be calculated for the aerial vehicle 120 which may be disconnected and reconnected to the mounting unit 116 in different orientations. As is shown in FIG. 1F, the aerial vehicle 120 may be reoriented about the mounting unit 116 by rotating the aerial vehicle 120 forward or backward, e.g., about a lateral axis (or pitch axis) of the aerial vehicle 120, and coupling the aerial vehicle 120 to the mounting unit 116 at different pitch angles, or by rotating the aerial vehicle 120 to the left or right, e.g., about a normal axis (or yaw axis) of the aerial vehicle 120, and coupling the aerial vehicle 120 to the mounting unit 116 at different yaw angles. With the aerial vehicle 120 coupled to the mounting unit 116 in different orientations about one or more of the normal axis of the aerial vehicle 120, the lateral axis of the aerial vehicle 120, or the longitudinal axis of the aerial vehicle 120, rotations may be imparted upon the aerial vehicle 120, e.g., by applying forces to portions of the aerial vehicle 120 and/or the mounting unit 116, and causing a torque on the aerial vehicle 120 about their respective vertical axes. Data captured by the inertial measurement unit 140 as the aerial vehicle 120 oscillates about each of the vertical axes may be processed to calculate not only a value of a moment of inertia of the aerial vehicle 120 about a specific vertical axis but also a vector corresponding to the specific vertical axis.

After the process has been repeated a predetermined number of times, e.g., by releasably coupling the aerial vehicle 120 to the mounting unit 116 in a predetermined number of discrete orientations, imparting rotations upon the aerial vehicle 120 in such orientations, and calculating moments of inertia and vectors corresponding to vertical axes based on data captured by the inertial measurement unit 140, the moments of inertia and the vectors may be used to calculate a moment of inertia tensor for the aerial vehicle about its principal axes, e.g., a normal axis (or yaw axis), a lateral axis (or pitch axis), and a longitudinal axis (or roll axis) of the aerial vehicle 120.

A moment of inertia tensor is defined as the matrix set forth in Equation (2), $$I = \begin{bmatrix} I_{xx} & I_{xy} & I_{xz} \\ I_{yx} & I_{yy} & I_{yz} \\ I_{zx} & I_{zy} & I_{zz} \end{bmatrix} \qquad (2)$$

where I is the moment of inertia tensor, where $I_{xx}$, $I_{yy}$, and $I_{zz}$ are moments of inertia about an x-axis, a y-axis and z-axis, respectively, where $I_{xy}$ and $I_{yx}$ are products of inertia about a plane defined by the x-axis and they-axis, where $I_{xz}$ and $I_{zx}$ are products of inertia about a plane defined by the x-axis and the z-axis and where $I_{yz}$ and $I_{zy}$ are products of inertia about a plane defined by they-axis and the z-axis.

For any given vertical axis i having a vector $V_i = (v_x, v_y, v_z)_i$, a moment of inertia $I_i$ about the vertical axis i may be calculated according to Equation (3), or $$I_i = V_i \cdot I \cdot V_i^T \qquad (3)$$

which may be rewritten according to Equation (4), or $$I_v = \begin{bmatrix} v_x & v_y & v_z \end{bmatrix} \cdot I \cdot \begin{bmatrix} v_x \\ v_y \\ v_z \end{bmatrix} \qquad (4)$$

As is shown in FIG. 1G, the various moments of inertia of the aerial vehicle 120 calculated based on oscillations about a predetermined number of vertical axes, and the vectors corresponding to the respective vertical axes, may be used to solve for values of a moment of inertia tensor about the principal axes of the aerial vehicle 120, or moments of inertia $I_{xx}$, $I_{yy}$, and $I_{zz}$, as well as products of inertia $I_{xy}$, $I_{yx}$ calculated about a plane defined by the x-axis and the y-axis, products of inertia $I_{yz}$ and $I_{zx}$ calculated about a plane defined by the x-axis and the z-axis, and products of inertia $I_{yz}$ and $I_{zy}$ calculated about a plane defined by the y-axis and the z-axis. More specifically, as is shown in FIG. 1G, a one-dimensional matrix including six values of observed moments of inertia observed with the aerial vehicle 120 in six orientations equals a product of a moment of inertia transformation matrix defined by values of the respective vector components in the six orientations and a one-dimensional matrix including six values of the moments of inertia $I_{xx}$, $I_{yy}$, and $I_{zz}$ and the products of inertia $I_{xy}$, $I_{yx}$ and $I_{xz}$ corresponding to the an x-axis, ay-axis and a z-axis of the inertial measurement unit 140. A moment of inertia tensor may be formed from the six values of the moments of inertia $I_{xx}$, $I_{yy}$, $I_{zz}$ and the products of inertia $I_{xy}$, $I_{yx}$, $I_{xz}$, according to Equation (2). As is discussed above, where the inertial measurement unit 140 is installed or mounted at or sufficiently near a center of gravity of the aerial vehicle 120, the moment of inertia tensor of the inertial measurement unit 140 may be presumed to be the moment of inertia tensor of the aerial vehicle 120. If the inertial measurement 140 is installed or mounted elsewhere, e.g., in a position other than that of the center of gravity of the aerial vehicle 120, however, the moment of inertia tensor of the inertial measurement unit 140 may be transformed to a moment of inertia tensor of the aerial vehicle 120, where a vector between the position of the center of gravity of the aerial vehicle and the position of the inertial measurement unit 140 is known. For example, in some embodiments, the values of the moment of inertia tensor of the inertial measurement unit 140 may be multiplied by another transformation matrix derived based on a vector from the position of the center of gravity of the aerial vehicle 120 to the position of the inertial measurement unit 140, in order to transform such values into values of a moment of inertia tensor of the aerial vehicle 120.

A moment of inertia is generally defined as a property of a distribution of mass in space that represents the body's resistance to rotation about a given axis. Whereas a body's mass characterizes its resistance to linear changes in motion, the body's moment of inertia characterizes its resistance to rotational changes in motion. Determining an accurate value of a moment of inertia tensor is critical to the design and safe operation of an aerial vehicle. For example, many manned and unmanned aerial vehicles include automated controllers for maintaining an aerial vehicle on a selected course, at a selected altitude or at a selected speed in response to one or more in-flight disturbances, e.g., by feedback or hysteresis. Such controllers are constructed by dynamic simulations of in-flight conditions of the aerial vehicles, which necessarily depend on accurately determined moment of inertia tensors for the aerial vehicles.

Mathematically, a value of a moment of inertia of a body about an axis may be calculated as a sum of products of mass elements of bodies and squares of distances of the body from a given axis, or as an integral of infinitesimal mass elements over distances of such elements from the given axis. For some bodies having common shapes, scalar values of moment of inertia tensors may be estimated according to one or more equations. For example, moments of inertia may be calculated for objects having shapes of rods, plates, prisms, disks, cylinders, cones, spheres or other shapes according to common equations that simplify the sums of products or integrations of mass elements for objects of such shapes, e.g., as functions of their respective masses, lengths, diameters, widths, lengths or thicknesses. Where a composite body is formed from a series of distinct bodies or subbodies, moments of inertia of each of the individual bodies or sub-bodies about a plurality of axes may be determined and added to determine moments of inertia of the composite body about such axes.

Where a body may not be readily represented as a composite formed from one or more distinct sub-bodies, however, moments of inertia of the body typically must be determined by experimentation. As is noted above, one experimental technique for determining moments of inertia of a body about a plurality of axes is a bifilar pendulum technique (or a bifilar suspension technique). In such techniques, an object is suspended by a pair of parallel connectors, or filars, having substantially equal lengths, and rotated about a vertical axis, e.g., as a torsional pendulum. A moment of inertia tensor of the object about the vertical axis may be calculated as a function of lengths of the filars, a period of oscillation of the object, and a mass of the object. To determine moments of inertia about principal axes of an object, e.g., an aerial vehicle, the object must be properly aligned such that each of the respective principal axes is aligned vertically, and subject to multiple rotations. Moreover, a period of oscillation for the object is commonly timed by hand, and is subject to inaccuracies.

The systems and methods of the present disclosure are directed to determining moment of inertia tensors for aerial vehicles or, alternatively, one or more other objects. An aerial vehicle may be suspended from a ceiling or other stable surface or structure in a specific orientation by two or more parallel filars of substantially equally length. An initial rotation about a vertical axis may be imparted upon the aerial vehicle, e.g., by applying a force to the aerial vehicle or a unit to which the aerial vehicle is mounted. As the vehicle oscillates about the vertical axis, an onboard inertial measurement unit may capture data from which a period of the oscillations, and a vector corresponding to the vertical axis, may be determined. Using a mass of the aerial vehicle, the lengths of the filars, a distance between the filars, and the period of oscillation, a scalar representative of the moment of inertia about the vertical axis may be calculated. The process may be repeated any number of times by suspending the aerial vehicle by the two or more filars, imparting an initial rotation upon the aerial vehicle, and determining a period of the oscillations and a vector of the vertical axis based on data captured by the onboard inertial measurement unit. In some embodiments, the process may be performed three times, such as when the aerial vehicle is bilaterally symmetric about each of the three principal axes. In other embodiments, such as when the aerial vehicle is not bilaterally symmetric about one or more of the principal axes, the process is performed at least three times, e.g., three, four, five or six times. In accordance with the present disclosure, one or more of the processes disclosed herein may be performed any number of times for any aerial vehicle, or any other given object, regardless of the extent to which the aerial vehicle or other object is symmetric about any number of axes.

The various values of the moments of inertia and the corresponding vectors may be used to complete a moment of inertia tensor for the aerial vehicle, including values of the moments of inertia about the respective principal axes, as well as products of inertia to the extent that the aerial vehicles are asymmetrical about one or more of the principal axes, according to matrix algebra techniques.

In some embodiments, a mass of an object (e.g., an aerial vehicle) may be determined using one or more load cells provided in association with the filars from which the object is suspended. In some other embodiments, the mass of the object may be determined independently, e.g., prior to or after testing.

Additionally, in some embodiments, where an object (e.g., an aerial vehicle) is configured to carry one or more payloads or other cargo, the moment of inertia tensor may be calculated for the object without any such payloads or cargo in accordance with the present disclosure, and a moment of inertia tensor may be calculated for the object subject to various loading conditions based on the moment of inertia tensor calculated when the object is empty, along with moment of inertia tensors of the payloads or cargo. Alternatively, the object (e.g., an aerial vehicle) may be loaded with payloads or cargo of various masses or volumes, and subjected to evaluation in accordance with the present disclosure, in order to calculate a moment of inertia tensor for the object subject to various loading conditions.

In accordance with the present disclosure, a moment of inertia tensor may be calculated for any object, and the systems and methods disclosed herein are not limited to aerial vehicles. For example, in addition to manned or unmanned aerial vehicles, one or more of the systems and methods disclosed herein may be utilized to calculate moment of inertia tensors, or values of moments of inertia about various axes, for objects such as satellites, automobiles, boats, bicycles, or any other type or form of object.

Furthermore, moment of inertia tensors may be calculated using data captured by onboard inertial measurement units, or by inertial measurement units that are applied to one or more surfaces of an object prior to evaluation. For example, an aerial vehicle may be constructed with an inertial measurement unit in the form of a chip, a board, a circuit, or another component having a three-axis gyroscope, a three-axis accelerometer and a three-axis magnetometer (e.g., compass) for use in normal flight operations. The inertial measurements of the present disclosure may be associated with inertial navigation systems or any other components. A moment of inertia tensor may be calculated for the aerial vehicle using data gathered by the inertial measurement unit, including data regarding periods of oscillation with the aerial vehicle suspended in multiple discrete orientations with respect to a normal axis of the aerial vehicle, a lateral axis of the aerial vehicle or a longitudinal axis of the aerial vehicle. Alternatively, such an inertial measurement unit may be attached to an object using one or more fastening or attachment mechanisms such as straps, bolts, pins, screws, clamps or others, and a moment of inertia tensor may be calculated for the object using data gathered by the unit.

The systems and methods of the present disclosure may be used to obtain accurate measurements of moment of inertia values (e.g., a moment of inertia tensor) quickly and more efficiently than traditional bifilar pendulum techniques. An object need not be suspended in any specific orientation, and data regarding the periods of oscillation need not be determined manually. Rather, a period of oscillation and a vector corresponding to an axis of rotation may be determined based on data gathered by an inertial measurement unit, and used to calculate a moment of inertia tensor about principal axes of the object, or in the coordinate frame of the inertial measurement unit, based on such data.

Figure 2:
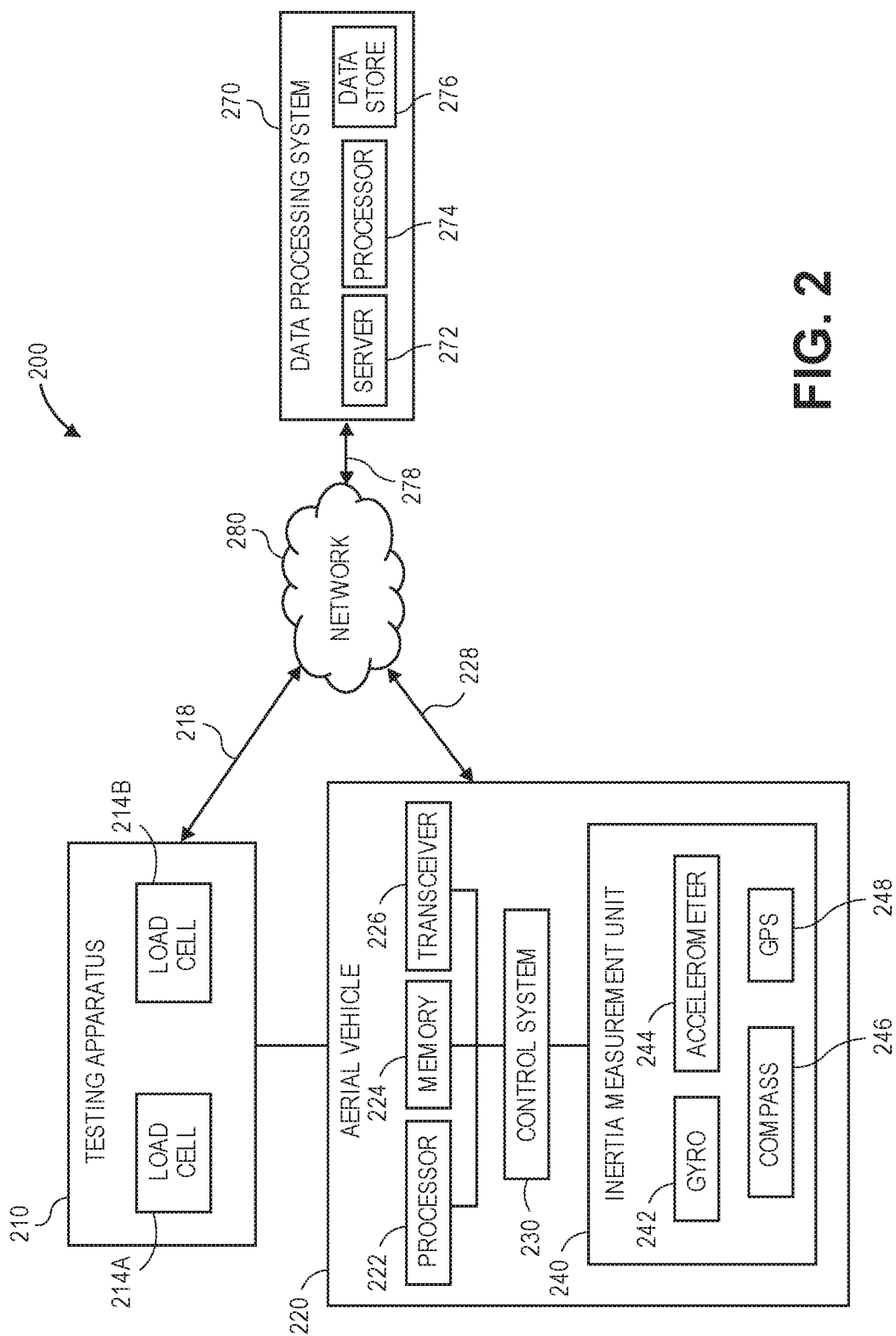
FIG. 2 is a block diagram of one system for calculating a moment of inertia tensor in accordance with embodiments of the present disclosure.

Referring to FIG. 2, a block diagram of one system 200 for calculating a moment of inertia tensor in accordance with embodiments of the present disclosure is shown. The system 200 of FIG. 2 includes a testing apparatus 210, an aerial vehicle 220 and a data processing system 270 that are connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

As is shown in FIG. 2, the testing apparatus 210 includes a pair of load cells 214A, 214B. The testing apparatus 210 may be a structure, a station or other rigid body having one or more stable surfaces from which an object may be suspended, e.g., by way of two or more filars. Any type or form of object may be suspended from filars within the testing apparatus 210, including but not limited to the aerial vehicle 220.

The load cells 214A, 214B each may be associated with a filar for suspending an object, e.g., the aerial vehicle 220, within the testing apparatus 210. For example, each of the load cells 214A, 214B, e.g., the load sensors 114A, 114B shown in FIG. 1A, may be coupled between a frame and a filar, e.g., one of the filars 112A, 112B shown in FIG. 1A. The load cells 214A, 214B may be any type of load sensor for measuring forces acting upon a filar with an object, e.g., the aerial vehicle 220, suspended therefrom, and a mass of the object may be determined based on such forces. For example, the load cells 214A, 214B may be S-beam load cells, or other forms of tension load cells that can measure forces acting upon the filars. The load cells 214A, 214B may be provided at ends of filars, such as is shown in FIG. 1A, or at any other locations on the filars between a stable surface to which the filars are mounted and the objects suspended therefrom. In some embodiments, the load cells 214A, 214B may be associated with one or more other computing devices or machines, and may communicate with the aerial vehicle 220, the data processing system 270 or one or more other computer devices (not shown) over the network 280, through the sending and receiving of digital data, as indicated by the line 218.

Alternatively, in some embodiments, the testing apparatus 210 need not include any load cells 214A, 214B, and a mass of an object may be determined using a scale or other sensor prior to or after suspending the object from one or more filars within the testing apparatus 210. Additionally, in some embodiments, the testing apparatus 210 may include one or more computing systems, e.g., servers, processors, memory components, data stores or the like, for processing periods of oscillation, vectors of axes of rotation, moments of inertia, or other information or data received from the testing apparatus 210 or the aerial vehicle 220.

The aerial vehicle 220 includes a processor 222, a memory 224 and a transceiver 226, as well as a control system 230 and an inertial measurement unit 240. Additionally, the aerial vehicle 220 may include any number of other components, including but not limited to airframes, propulsion motors, propellers, control surfaces, item engagement systems, landing gear components, lighting systems, sensors, or others.

The processors 222 may be configured to perform any type or form of computing function. For example, the processors 222 may control any aspects of the operation of the aerial vehicle 220 and any computer-based components thereon, including but not limited to propulsion motors, propellers, control surfaces, item engagement systems, landing gear components, lighting systems, imaging devices or other operational or environmental sensors. For example, the processors 222 may control the operation of one or more control systems or modules, such as the control system 230, for generating instructions for conducting operations of the aerial vehicle 220, including but not limited to instructions for causing propulsion motors to operate at a predetermined or selected speed, for causing propellers to rotate at a predetermined or selected pitch or configuration, or for causing one or more sensors to capture information or data of any type or form. Similarly, the processors 222 may control the operation of one or more control surfaces (not shown), including but not limited to wings, rudders, ailerons, elevators, flaps, brakes, slats or other features. The processors 222 may communicate with the data processing system 270 or one or more other computer devices (not shown) over the network 280, through the sending and receiving of digital data, as indicated by the line 228.

The processors 222 may be a uniprocessor system including one processor, or a multiprocessor system including several processors (e.g., two, four, eight, or another suitable number), and may be capable of executing instructions. For example, in some embodiments, the processors 222 may be a general-purpose or embedded processor implementing any of a number of instruction set architectures (ISAs), such as the x86, PowerPC, SPARC, or MIPS ISAs, or any other suitable ISA. Where one or more of the processors 222 is a part of a multiprocessor system, each of the processors within the multiprocessor system may implement the same ISA, or different ISAs.

Additionally, the memory or storage components 224 (such as databases or data stores) are configured for storing any type of information or data, e.g., instructions for operating the aerial vehicle 220, or information or data captured during operations of the aerial vehicle 220. The memory components 224 may be configured to store executable instructions, flight paths, flight control parameters and/or other data items accessible by or to the processors 222. The memory components 224 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceivers 226, e.g., by transmission media or signals, such as electrical, electromagnetic, or digital signals, which may be conveyed via a communication medium such as a wired and/or a wireless link.

The transceivers 226 may be configured to enable the aerial vehicle 220 to communicate using one or more wired or wireless systems or components, e.g., wired technologies such as Universal Serial Bus (or "USB") or fiber optic cable, or standard wireless protocols, such as over the network 280 or directly. In some embodiments, the transceivers 226 may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 226 may be configured to transmit and receive light signals, and may include one or more light emitting diode (or "LED") transmitters and/or one or more optical sensors or receivers. In still other embodiments, the transceivers 226 may be configured to transmit and receive acoustic signals, and may include one or more devices having transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters, as well as one or more microphones, piezoelectric sensors, vibration sensors or other acoustic sensors. Such signals may be open and unencrypted, and captured and interpreted by any vehicle, station or object within a signal range of the transceivers 226, or subject to any form or level of encryption.

The transceivers 226 may further include or be in communication with one or more input/output (or "I/O") interfaces, network interfaces and/or input/output devices, and may be configured to allow information or data to be exchanged between one or more of the components of the aerial vehicle 220, or to one or more other computer devices or systems via the network 280. For example, in some embodiments, the transceivers 226 may be configured to coordinate I/O traffic between the processors 222 and one or more onboard or external computer devices or components. The transceivers 226 may perform any necessary protocol, timing or other data transformations in order to convert data signals from a first format suitable for use by one component into a second format suitable for use by another component. In some embodiments, the transceivers 226 may include support for devices attached through various types of peripheral buses, e.g., variants of the Peripheral Component Interconnect (PCI) bus standard or the Universal Serial Bus (USB) standard. In some other embodiments, functions of the transceivers 226 may be split into two or more separate components, or integrated with the processors 222. Although the transceivers 226 are shown as single components for transmitting and/or receiving information or data, those of ordinary skill in the pertinent arts will recognize that the aerial vehicle 220 may include any number of transceivers, or, alternatively or additionally, any number of transmitting and/or receiving devices that may be provided as discrete components.

The control system 230 may include one or more electronic speed controls, power supplies, navigation systems and/or payload engagement controllers for controlling the operation of the aerial vehicle 220 and for engaging with or releasing items (not shown), as desired. For example, the control system 230 may be configured to cause or control the operation of one or more of propulsion motors, propellers, sensors or other aspects of the aerial vehicle 220, such as to cause one or more of propulsion motors to rotate propellers at a desired speed, in order to guide the aerial vehicle 220 along a determined or desired flight path, or to perform any other function. The control system 230 may also be configured to cause or control the operation of the one or more sensors, which may include but are not limited to imaging devices, acoustic sensors, light sensors, or any other type or form of environmental and/or operational sensors (not shown). The control system 230 may further control other aspects of the aerial vehicle 220, including but not limited to the operation of one or more control surfaces (not shown) such as wings, rudders, ailerons, elevators, flaps, brakes, slats or other features within desired operating ranges, or the enactment with or release of one or more items by one or more engagement systems (not shown). In some embodiments, the control system 230 may be integrated with one or more of the processors 222, the memory components 224 and/or the transceivers 226.

As is discussed above, in some embodiments, the aerial vehicle 220 may include one or more propulsion motors (e.g., electric, gasoline-powered or any other motor) joined to an airframe and capable of generating sufficient rotational speeds of corresponding propellers or other components to provide lift and/or thrust forces to the aerial vehicle 220 and any payload engaged thereby, such as to aerially transport the engaged payload from one location to another. For example, one or more of such propulsion motors may be a brushless direct current (DC) motor such as an outrunner brushless motor or an inrunner brushless motor. Additionally, the propulsion motors of the aerial vehicle 220 may be of any kind, and may be dedicated to one or more purposes or functions. For example, one or more of the propulsion motors may be aligned or configured to provide forces of lift to the aerial vehicle 220, exclusively, while one or more of the propulsion motors may be aligned or configured to provide forces of thrust to the aerial vehicle 220, exclusively. Alternatively, one or more of the propulsion motors may be aligned or configured to provide forces of lift and/or forces of thrust to the aerial vehicle 220, as needed. For example, such propulsion motors may be fixed in their orientation on the aerial vehicle 220, or configured to vary their respective orientations, e.g., a tilt-rotor aircraft. Moreover, such propulsion motors may be aligned or configured to operate with different capacities or ratings, or at different speeds, or coupled to propellers having different sizes and shapes. Such propulsion motors may be controlled by the processors 222, the control system 230, or any other aspect of the aerial vehicle 220.

Additionally, the propulsion motors of the aerial vehicle 220 may be coupled to one or more propellers, e.g., any rotors or rotatable systems having a plurality of shaped blades joined to a hub or boss. Each of such propellers may be rotatably mounted to a mast or shaft associated with a corresponding one of the propulsion motors and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 222, the control system 230, or any other aspect of the aerial vehicle 220.

The inertial measurement unit 240 may be any type or form of device for sensing changes in linear or rotational motion of the aerial vehicle 220. As is shown in FIG. 2, the inertial measurement 240 includes one or more gyroscopes 242, one or more accelerometers 244, one or more compasses (or other magnetometer) 246, and a Global Positioning System ("GPS") transceiver 248. In some embodiments, the inertial measurement unit 240 may be installed onboard the aerial vehicle 220, such as at or near a center of gravity of the aerial vehicle 220, or in another position aboard the aerial vehicle 220, and intended for use during in-flight operations, e.g., in association with an inertial navigation system. In some other embodiments, however, the inertial measurement unit 240 may be strapped or mounted to an object suspended within the testing apparatus 210, e.g., the aerial vehicle 220.

The gyroscopes 242 may be any mechanical or electrical device, component, system, or instrument for determining an orientation, e.g., the orientation of the aerial vehicle 220. For example, the gyroscope 242 may be a traditional mechanical gyroscope having at least a pair of gimbals and a flywheel or rotor. Alternatively, the gyroscope 242 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 220. The accelerometers 244 may be any mechanical or electrical devices, components, systems, or instruments for sensing or measuring accelerations, including but not limited to devices having one or more potentiometers, linear variable differential transformers, variable reluctance devices or piezoelectric components.

The compasses 246 may be any devices, components, systems, or instruments adapted to determine one or more directions with respect to a frame of reference that is fixed with respect to the surface of the Earth (e.g., a pole thereof). For example, the compasses 246 may include one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). The GPS transceiver 248 may be any device, component, system or instrument adapted to receive signals (e.g., trilateration data or information) relating to a position of the inertial measurement unit 240 from one or more GPS satellites of a GPS network (not shown), or for reporting the position of the inertial measurement unit 240 determined based on such signals.

In some embodiments, the inertial measurement unit 240 may further include any number of computer components, e.g., one or more processors, memory components and/or transceivers (not shown), or any other components for aiding in the determination of orientations, velocities and/or accelerations.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing information regarding periods of oscillation, vectors of axes of rotation, moments of inertia, or other information or data received from the testing apparatus 210 or the aerial vehicle 220 or, alternatively, provided in connection with one or more other physical or virtual services configured to receive, analyze or store such information or data, as well as one or more other functions. The servers 272 may be connected to or otherwise communicate with the processors 274 and the data stores 276, which may store any type of information or data, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., acoustic signals or energy, or related information or data received from the aerial vehicle 220, or from one another, or from one or more other external computer systems (not shown) via the network 280. In some embodiments, the data processing system 270 may be provided in a physical location, e.g., in a location of the testing apparatus 210, and in association with the testing apparatus 210. In other such embodiments, the data processing system 270 may be provided in one or more alternate or virtual locations, e.g., in a "cloud"-based environment. In still other embodiments, one or more components of the data processing system 270 may be provided onboard one or more aerial vehicles, including but not limited to the aerial vehicle 220.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein.

Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The testing apparatus 210, the aerial vehicle 220 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 220 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 220 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 222, the control system 230 or the processor 274, or any other computers or control systems utilized by the aerial vehicle 220 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, some embodiments of the present disclosure may be utilized to calculate values of moments of inertia for a moment of inertia tensor for an object, such as an aerial vehicle, based on data gathered by an inertial measurement unit provided on (or in association with) the object.

Figure 3A:
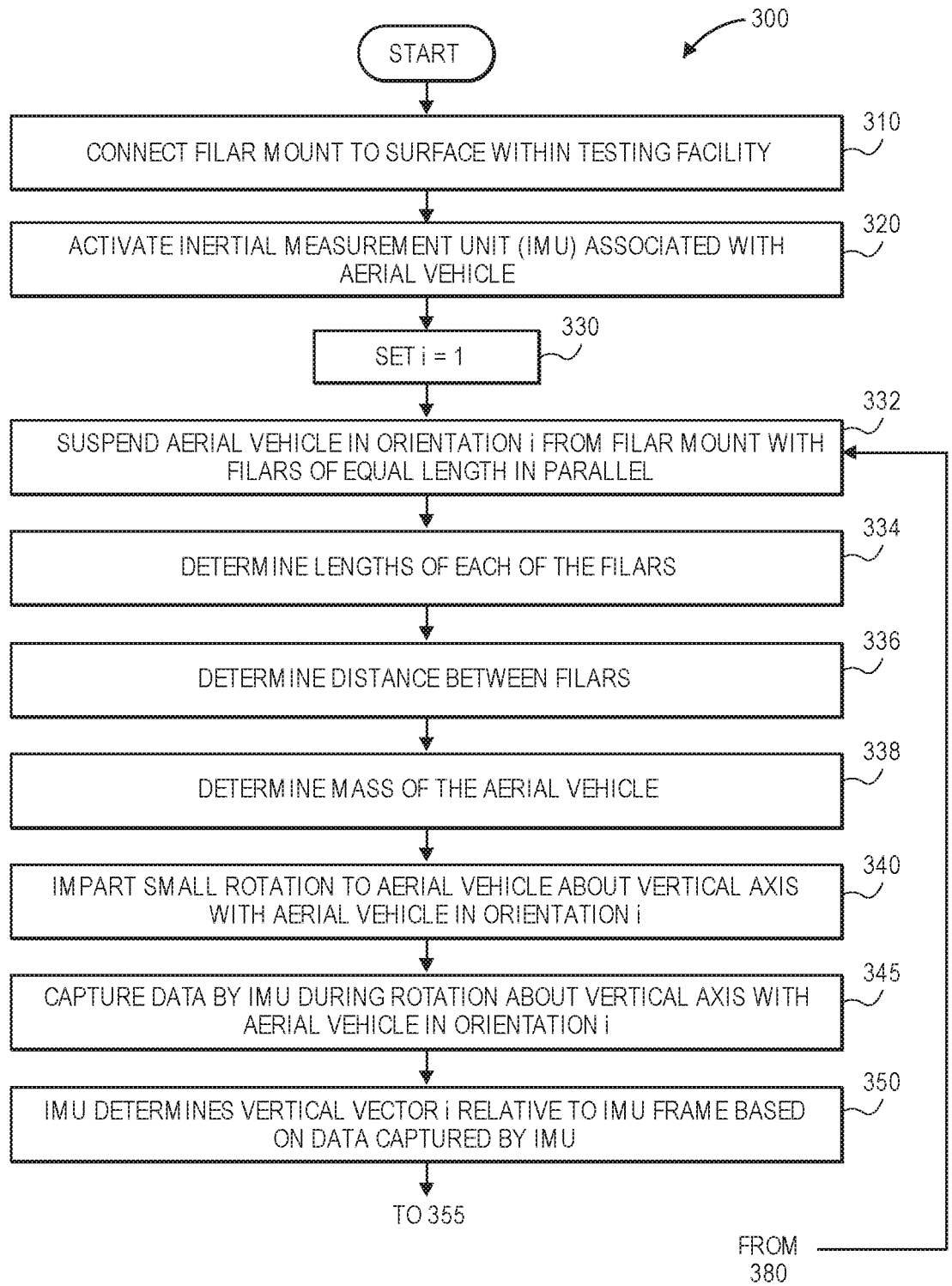
FIGS. 3A and 3B are a flow chart of one method for calculating a moment of inertia tensor in accordance with embodiments of the present disclosure.
Figure 3B:
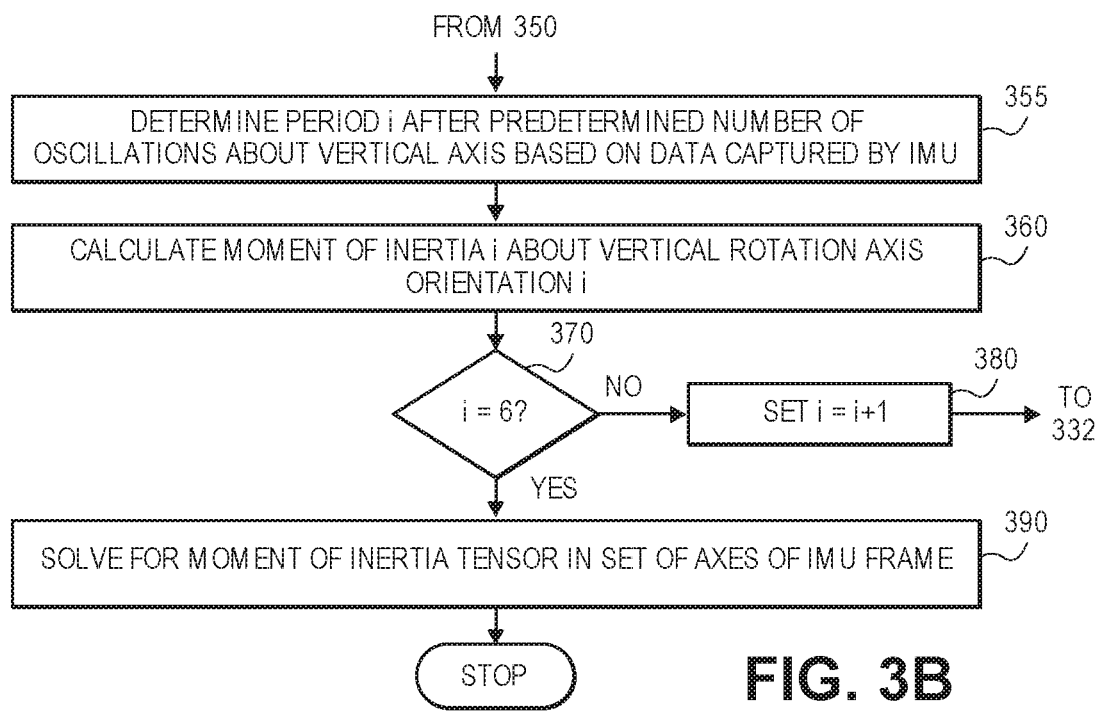

Referring to FIGS. 3A and 3B, a flow chart 300 of one method for calculating a moment of inertia tensor in accordance with embodiments of the present disclosure is shown. At box 310, a filar mount is connected to a surface within a testing facility. For example, a mount, such as the filar mount 115 of FIGS. 1A through 1E, may be bolted, screwed, riveted, nailed or otherwise joined to a ceiling or other stable surface within a testing facility in a manner that enables two or more filars to descend below the filar mount. At box 320, an inertial measurement unit associated with an aerial vehicle is powered on. The inertial measurement unit may be permitted to perform any start-up or boot-up procedures that may be required to power on the inertial measurement unit, or one or more gyroscopes, accelerometers, compasses and/or magnetometers, or GPS systems provided thereon.

At box 330, a value of a step variable i is set to one, or i=1. At box 332, the aerial vehicle is suspended in an orientation i from the filar mount by two or more filars in parallel, and with the filars having equal lengths. For example, referring again to FIGS. 1A through 1G, the filar mount 115 may be releasably coupled to the aerial vehicle 120, with the aerial vehicle 120 in a distinct orientation, on one or more surfaces using one or more fastening or attachment mechanisms such as straps, bolts, pins, screws, clamps or others. At box 334, lengths of the filars are determined, and at box 336, a distance between the filars is determined, e.g., manually or automatically. At box 338, a mass of the aerial vehicle is determined. For example, the aerial vehicle's mass may be determined by one or more load cells provided in association with the filars, e.g., the load cells 114A, 114B of FIGS. 1A through 1G, as the aerial vehicle is suspended from the filars, or, alternatively, using one or more scales or other measuring apparatuses prior to or after suspending the aerial vehicle from the filars.

At box 340, a small rotation is imparted upon the aerial vehicle about the vertical axis, with the aerial vehicle suspended in the orientation i. A torque may be applied to the aerial vehicle, e.g., by applying a sufficient force to the aerial vehicle about the vertical axis. In some embodiments, an initial angle caused by imparting the small rotation onto the aerial vehicle is approximately ten degrees (10°) or less, such that the sine of the initial angle is approximately a value of the initial angle in radians, to within one percent, e.g., a small angle approximation. At box 345, the inertial measurement unit captures data during the oscillation of the aerial vehicle. The data may include angular orientations, angular or linear velocities, or any other data regarding motion of the aerial vehicle.

At box 350, the inertial measurement unit determines a vertical vector i relative to its coordinate frame, based on the data captured during the oscillation of the aerial vehicle. For example, with the aerial vehicle suspended from the filars in the orientation i and motionless, the only acceleration acting upon the inertial measurement unit is acceleration due to gravity g, or approximately 9.80665 m/s² (or about 32.174 ft/s²) at sea level. A vector $V_i=[v_x, v_y, v_z]_i$ corresponding to acceleration sensed by the inertial measurement unit with the aerial vehicle suspended in the orientation i is, therefore, a vector corresponding to a vertical axis with the aerial vehicle suspended in the orientation i. At box 355, a period i of oscillation is determined after a predetermined number of oscillations about the vertical axis based on data captured by the inertial measurement unit. For example, referring again to FIG. 1D, the period of oscillation T may be determined from a time nT between a predetermined number of amplitudes, e.g., n, by dividing the time nT by the predetermined number. As is shown in FIG. 1D, a plot of the amplitudes of oscillations over time may take the form of a damped sinusoid, with diminishing amplitudes and a substantially constant period.

At box 360, a moment of inertia i of the aerial vehicle about the vertical axis with the aerial vehicle suspended in the orientation i is calculated based on the mass of the aerial vehicle, the period of oscillation, the lengths of the filars, and the distance between the filars. For example, as is noted above, a moment of inertia i about a given axis may be calculated according to Equation (1), or $I_i = mgr_i^2 T_i^2/4\pi^2 l_i$, where m is the mass of the aerial vehicle, $r_1$ is one-half of the distance $2r_i$ between the filars, $T_i$ is the period of oscillation and $l_i$ is the common length of the filars.

At box 370, whether the value of the step variable i is six is determined. As is noted above, performing a process six times ensures that a moment of inertia tensor may be calculated about each of the principal axes of the aerial vehicle, regardless of whether the aerial vehicle is bilaterally symmetric about any of the respective principal axes. Alternatively, in some embodiments, the process may be repeated fewer than six times, such as three, four, or five times, where the aerial vehicle is bilaterally symmetric about one or more of the principal axes. In such embodiments, at box 370, whether the value of the step variable i is three, four or five, or any other number, may be determined.

If the value of the step variable i is not six, then the process advances to box 380, where the value of the step variable i is incremented by one, e.g., by setting the value of i to equal i+1, before returning to box 332, where the aerial vehicle is suspended in a different orientation i from the filar mount by the two or more filars in parallel, and with the filars having equal lengths. If the value of the step variable i is six, then the process advances to box 390, where the moment of inertia tensor is solved with respect to the axes of the inertial measurement unit, and the process ends. For example, as is shown in Equation (2), above, a moment of inertia tensor calculated with respect to x-, y- and z-axes is a matrix comprising the moments of inertia $I_{xx}$, $I_{yy}$, and $I_{zz}$, as well as products of inertia $I_{xy}$, $I_{yx}$ calculated about a plane defined by the x-axis and the y-axis, products of inertia $I_{xz}$ and $I_{zx}$ calculated about a plane defined by the x-axis and the z-axis, and products of inertia $I_{yz}$ and $I_{zy}$ calculated about a plane defined by the y-axis and the z-axis. As is shown in FIG. 1G, the moments of inertia and the products of inertia may be calculated by matrix algebra, e.g., by multiplying a single-row matrix of the calculated moment of inertia values by an inverse of the matrix. In some embodiments, such as where an aerial vehicle is bilaterally symmetric about one or more principal axes, values of the products of inertia will be zero. Additionally, as is noted above, where the inertial measurement unit is installed or mounted at or near a position of a center of gravity of the aerial vehicle, the moment of inertia tensor calculated with respect to x-, y- and z-axes is a moment of inertia calculated about the principal axes of the aerial vehicle. In some other embodiments, such as where the inertial measurement unit is mounted elsewhere with respect to the center of gravity, a moment of inertia for the aerial vehicle may be calculated where a vector extending between a position of the center of gravity and a position of the inertial measurement unit is known, e.g., by a moment of inertia transformation matrix, such as is shown in FIG. 1G.

Although the flow chart 300 of FIG. 3 shows the determination of the vertical vector i at step 350 and the determination of the period i at step 355, prior to suspending the aerial vehicle in a different orientation, those of ordinary skill in the pertinent arts may recognize that the vehicle may be suspended in the various orientations and caused to oscillate about a vertical axis in each of such orientations any number of times, during which data is captured by the inertial measurement unit, prior to determining the vertical vectors or the periods of oscillation for the aerial vehicle in any of the orientations, e.g., as a matter of efficiency or ease of operation. Additionally, those of ordinary skill in the pertinent arts will recognize that one or more of the systems and methods disclosed herein may be used to calculate a moment of inertia tensor for any object, and are not limited for use in connection with aerial vehicles.

As is discussed above, a moment of inertia tensor for an object may be calculated by suspending the object in various orientations, imparting rotations onto the object in each of the orientations, and determining periods and vertical axes with the object in each of the orientations based on data captured by an inertial measurement unit installed or embedded within the object, or provided in association with the object, then calculating specific values for the moments of inertia about the principal axes of the object based on such values. Referring to FIGS. 4A through 4D, views of aspects of one system for calculating a moment of inertia tensor in accordance with embodiments of the present disclosure are shown. Except where otherwise noted, reference numerals preceded by the number "4" shown in FIGS. 4A through 4D indicate components or features that are similar to components or features having reference numerals preceded by the number "2" in FIG. 2 or by the number "1" shown in FIGS. 1A through 1G.

As is shown in FIGS. 4A through 4D, an object, viz., an aerial vehicle 420, may be suspended within a testing facility or other location by a pair of filars 412A, 412B that are joined to a ceiling or other stable surface (not shown) within the testing facility. The aerial vehicle 420 may be suspended from the filars 412A, 412B with the filars 412A, 412B in parallel, and the filars 412A, 412B may have equal lengths.

Figure 4A:
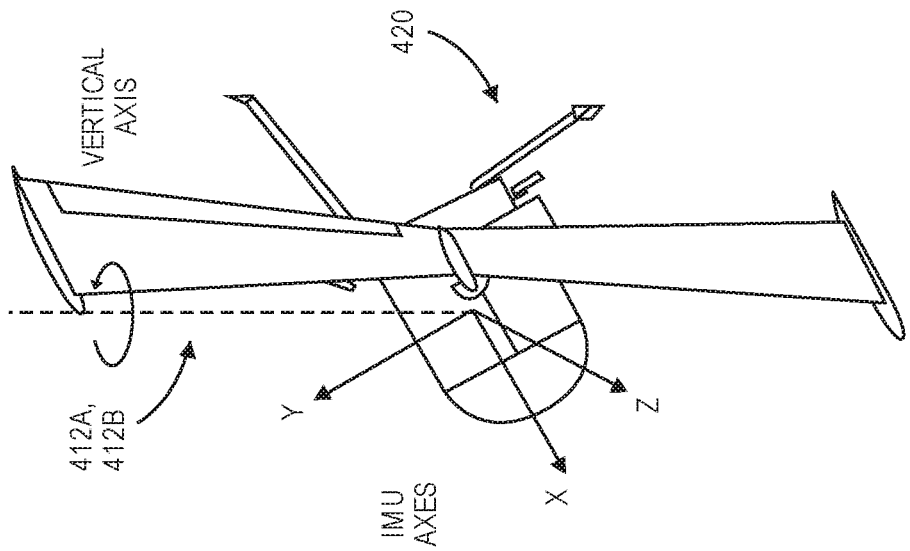
FIGS. 4A through 4D are views of aspects of one system for calculating a moment of inertia tensor in accordance with embodiments of the present disclosure.

For example, as is shown in FIG. 4A, the aerial vehicle 420 is suspended with the aerial vehicle 420 in a first orientation, e.g., with a vertical axis substantially corresponding to a y-axis of the inertial measurement unit 440, by the filars 412A, 412B. As is discussed above, where the inertial measurement unit 440 is installed or mounted at or near a center of gravity of the aerial vehicle 420, the y-axis of the inertial measurement unit 440 will correspond to a yaw axis of the aerial vehicle 420.

With the aerial vehicle 420 suspended in the first orientation, as shown in FIG. 4A, the aerial vehicle 420 may be caused to oscillate about the vertical axis by applying a force, e.g., a torque, to the aerial vehicle 420, and data regarding the oscillations of the aerial vehicle 420 about the vertical axis, and the vertical axis itself, may be captured by an onboard inertial measurement unit 440 (not shown). The data may be used to determine a period of oscillation of the aerial vehicle 420, and a vector corresponding to the vertical axis of the aerial vehicle 420 suspended in the first orientation. A moment of inertia of the aerial vehicle 420 suspended in the first orientation may be calculated based on a mass of the aerial vehicle, one-half of the distance between the filars 412A, 412B, the period of oscillation, and the lengths of the filars 412A, 412B, such as according to Equation (1), above.

Figure 4B:
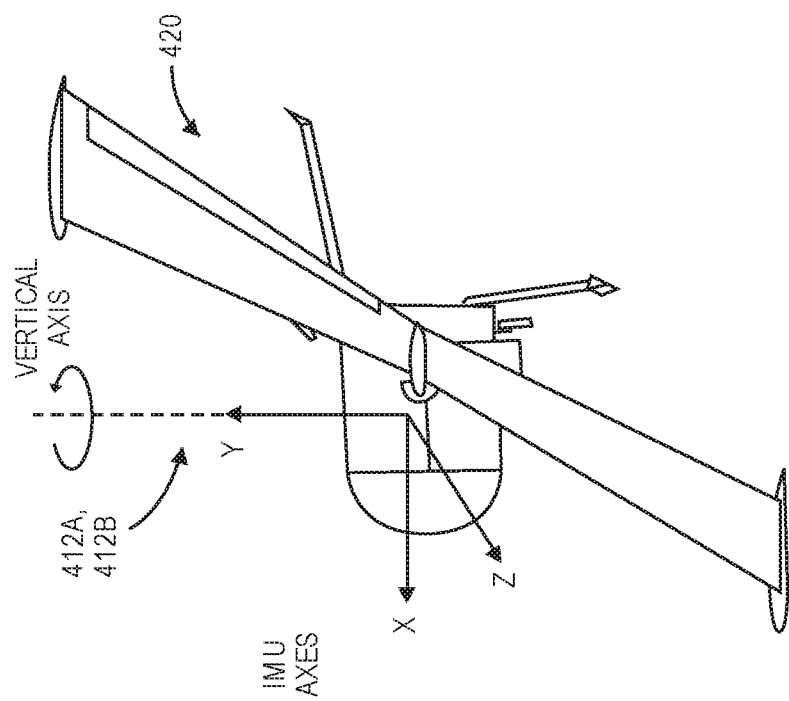

After the inertial measurement unit 440 has captured data during a sufficient number of oscillations of the aerial vehicle 420 in the first orientation shown in FIG. 4A, the aerial vehicle 420 may be placed in a second orientation, such as is shown in FIG. 4B, by detaching the aerial vehicle 420 from the filars 412A, 412B, reorienting the aerial vehicle 420, e.g., by rotating the aerial vehicle 420 forward about the pitch axis, and attaching the filars 412A, 412B to the aerial vehicle 420 in a different orientation. In accordance with the present disclosure, vertical axes of the aerial vehicle 420 as suspended in the first orientation shown in FIG. 4A and the second orientation of the aerial vehicle 420 as suspended in the second orientation shown in FIG. 4B need not be coaxial or otherwise associated with a principal axis of the aerial vehicle. Moreover, in some embodiments, the first orientation and the second orientation may be diverse with respect to one another. For example, in some embodiments, the first orientation of the aerial vehicle 420 and the second orientation of the aerial vehicle 420 are preferably diverse, such that an angle between one axis of the aerial vehicle 420 (e.g., a yaw axis, a pitch axis or a roll axis) in the first orientation and the one axis of the aerial vehicle 420 in the second orientation is not less than forty-five degrees and not greater than one hundred thirty-five degrees.

Figure 4C:
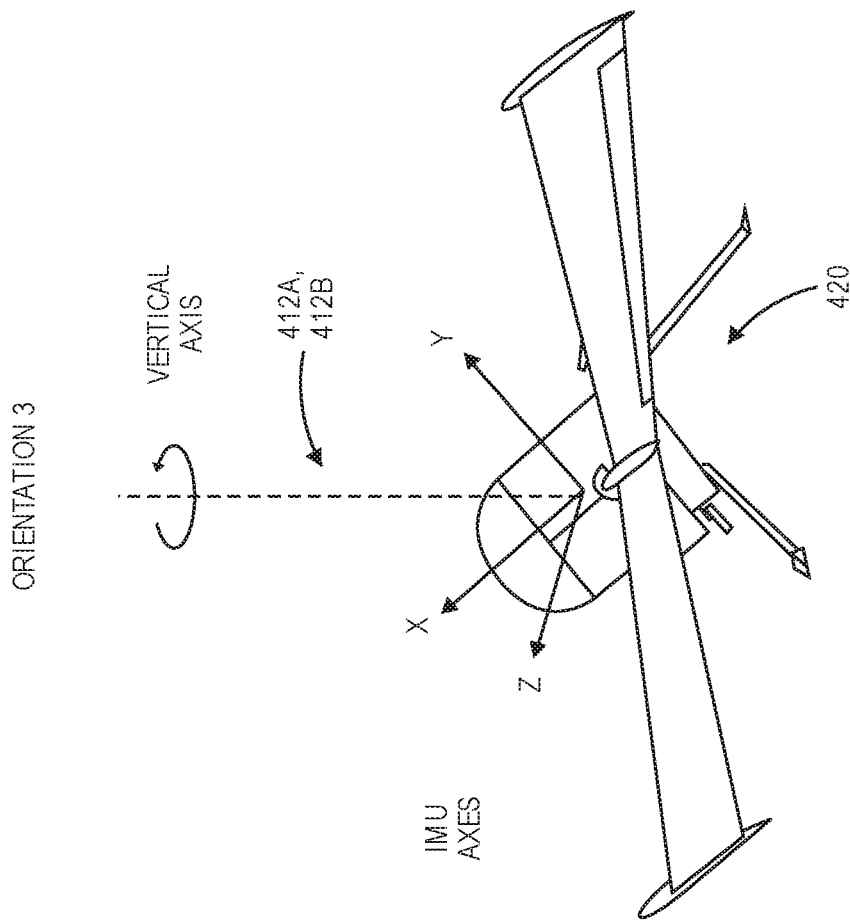
Figure 4D:
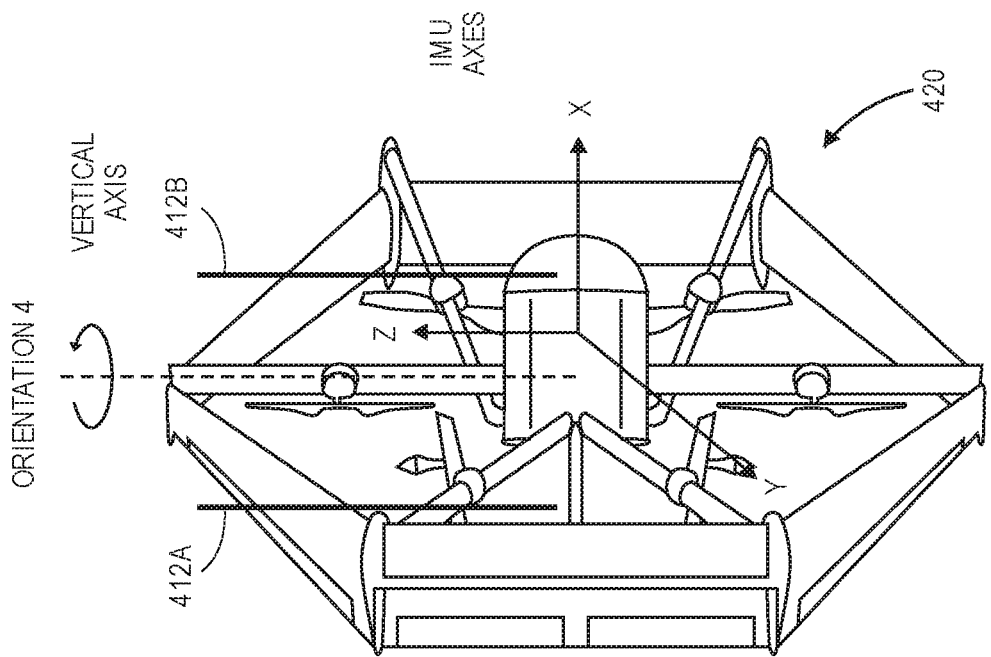

With the aerial vehicle 420 suspended in the second orientation, as shown in FIG. 4B, the aerial vehicle 420 may be caused to oscillate about the vertical axis by applying a force, e.g., a torque, to the aerial vehicle 420, and data regarding the oscillations of the aerial vehicle 420 may be captured by the onboard inertial measurement unit 440. The data may be used to determine a period of oscillation of the aerial vehicle 420, and a vector corresponding to the vertical axis of the aerial vehicle 420 suspended in the second orientation. Likewise, the aerial vehicle may be placed in a third orientation and a fourth orientation, such as is shown in FIG. 4C and FIG. 4D, by detaching the aerial vehicle 420 from the filars 412A, 412B, reorienting the aerial vehicle 420, e.g., by rotating the aerial vehicle 420 aft about the pitch axis, or rotating the aerial vehicle 420 about the yaw axis, and reattaching the filars 412A, 412B to the aerial vehicle 420 in different orientations, e.g., discrete orientations of the aerial vehicle 420 with respect to at least one of a normal axis of the aerial vehicle 420, a lateral axis of the aerial vehicle 420, or a longitudinal axis of the aerial vehicle 420. With the aerial vehicle 420 suspended in the third orientation, as shown in FIG. 4C, or the fourth orientation, as shown in FIG. 4D, the aerial vehicle 420 may be caused to oscillate about the vertical axes by applying forces, e.g., torques, to the aerial vehicle 420, and data regarding the oscillations of the aerial vehicle 420 may be captured by the onboard inertial measurement unit 440. The data may be used to determine a period of oscillation of the aerial vehicle 420, and a vector corresponding to the vertical axis of the aerial vehicle 420 suspended in the third orientation or the fourth orientation. Moments of inertia of the aerial vehicle 420 suspended in the second orientation, the third orientation or the fourth orientation may be calculated based on the mass of the aerial vehicle, one-half of the distance between the filars 412A, 412B, the periods of oscillation, and the lengths of the filars 412A, 412B, such as according to Equation (1), above.

From the moments of inertia of the aerial vehicle 420 suspended in the various orientations shown in FIGS. 4A through 4D, and the vectors determined based on data captured by the inertial measurement unit 440, a moment of inertia tensor may be calculated for the aerial vehicle 420 about the principal axes, viz., the yaw axis, the pitch axis and the roll axis, according to one or more of the equations discussed above.

As is noted above, the systems and methods of the present disclosure may be used to calculate moments of inertia for objects more accurately and efficiently than according to traditional bifilar pendulum techniques. Additionally, objects, such as aerial vehicles, may be outfitted with one or more systems or features for enabling the aerial vehicles to be suspended in various orientations. Referring to FIGS. 5A through 5D, views of aspects of one system for calculating a moment of inertia tensor in accordance with embodiments of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4D or by the number "2" in FIG. 2 or by the number "1" shown in FIGS. 1A through 1G.

Figure 5A:
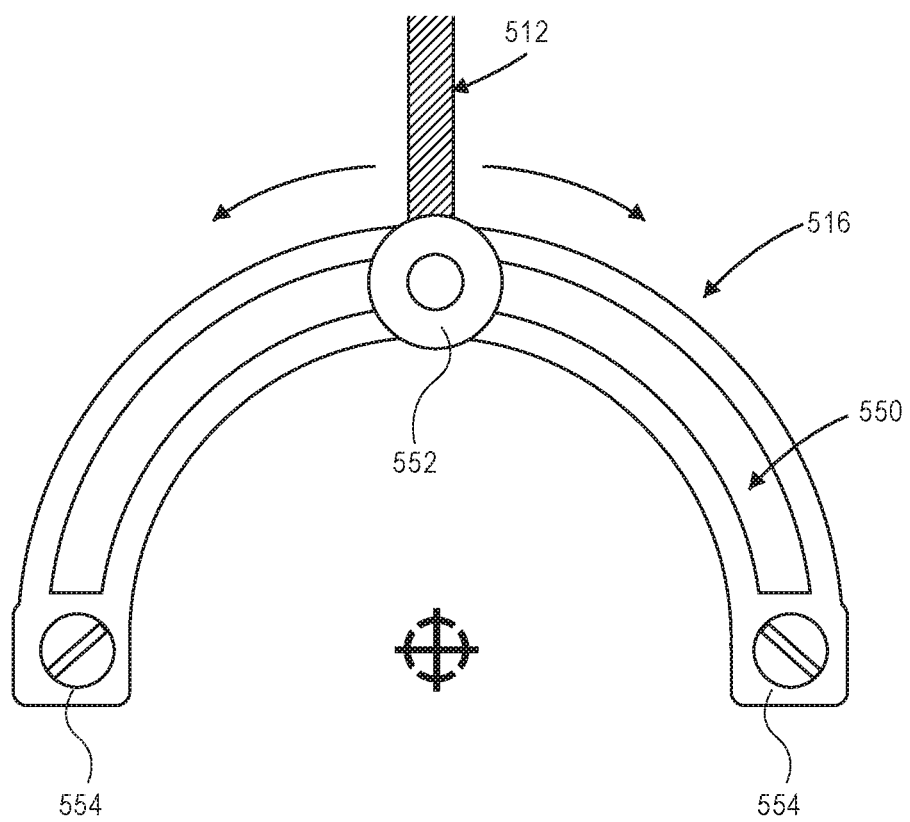
FIGS. 5A through 5D are views of aspects of one system for calculating a moment of inertia tensor in accordance with embodiments of the present disclosure.

As is shown in FIG. 5A, a mounting unit 516 includes a track 550 therein. Two or more of the mounting units 516 may be mounted to an object in various locations, e.g., by fasteners 554, or any other mechanisms such as straps, bolts, pins, screws, clamps or others. The track 550 includes a clamp 552 having a pin or other feature that is configured to travel along an arc of the track 550, and be fixed in position at any location within the track 550, e.g., by one or more clamping apparatuses or features. A filar 512 may be coupled to the clamp 552.

Figure 5B:
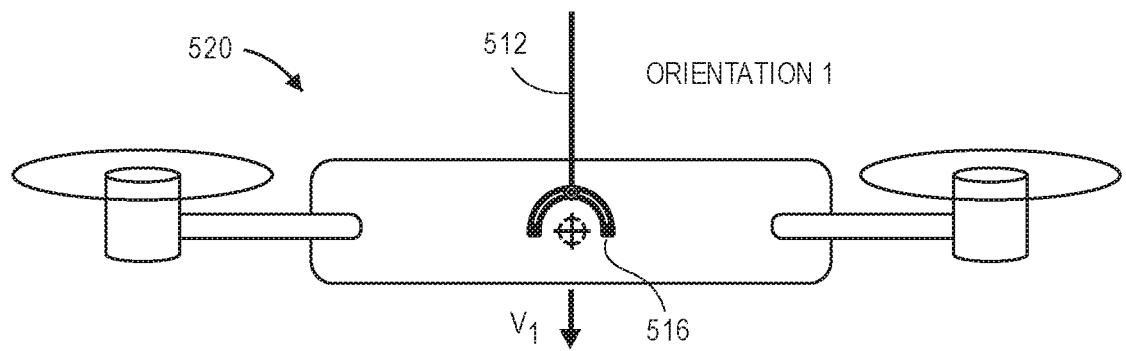
Figure 5C:
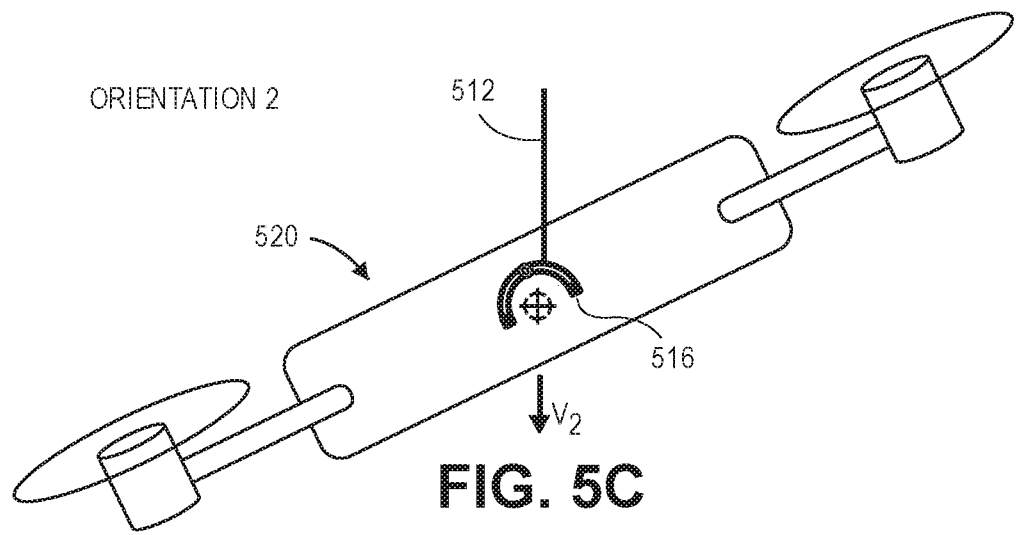
Figure 5D:
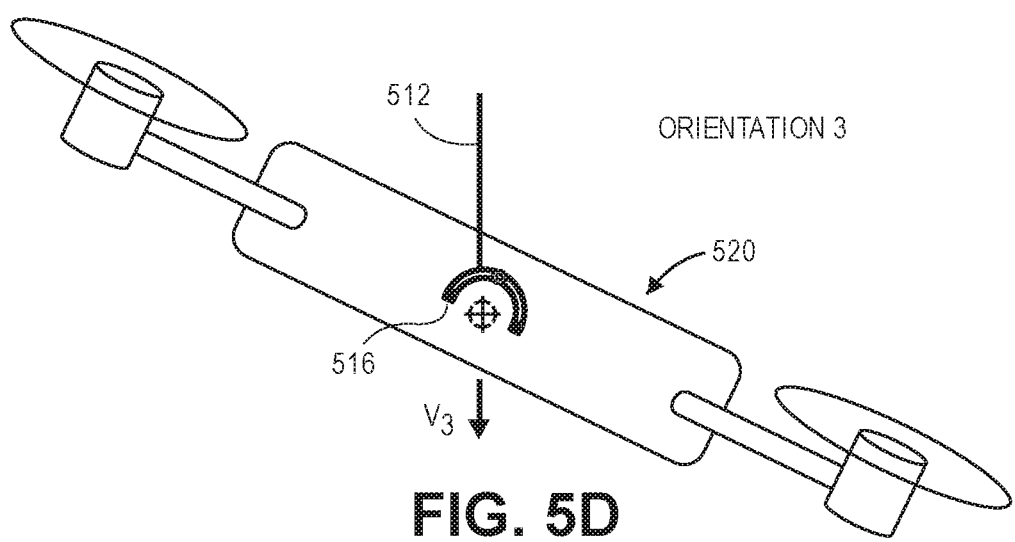

As is shown in FIG. 5A, when the clamp 552 is not fixed in position at any location along the track 550, the clamp 552 may be permitted to freely slide within the track 550 and fixed into position at a point along the track 550, such that the filars 512 will be aligned with a center of gravity of an object as the object is suspended by the filars 512. As is shown in FIGS. 5B through 5D, the mounting unit 516 enables an object coupled thereto, e.g., an aerial vehicle 520, to be suspended in a variety of orientations. For example, as is shown in FIG. 5B, the aerial vehicle 520 is suspended by two or more filars 512 in a first orientation, with the aerial vehicle 520 substantially flat, e.g., parallel to the horizon. In accordance with some embodiments of the present disclosure, an initial rotation may be imparted upon the aerial vehicle 520 in the first orientation, thereby causing the aerial vehicle 520 to oscillate about a vertical axis. An inertial measurement unit provided aboard the aerial vehicle 520, or otherwise provided in association with the aerial vehicle 520 may capture data during the oscillation of the aerial vehicle 520 about the vertical axis. The data captured during the oscillation may be used to determine a period of oscillation of the aerial vehicle 520, and a vector $V_1$ corresponding to the vertical axis of the aerial vehicle 520, with the aerial vehicle 520 in the first orientation.

After data has been captured during the oscillation of the aerial vehicle 520 in the first orientation, the aerial vehicle 520 may be repositioned to a second orientation, as is shown in FIG. 5C, by opening the clamp 552, rotating the aerial vehicle 520 about a pitch axis, and allowing the clamp 552 to travel to a new location within the track 550, before closing the clamp 552 in the new location within the track 550 and allowing the aerial vehicle 520 to be suspended therefrom. An initial rotation may be imparted upon the aerial vehicle 520 in the second orientation, thereby causing the aerial vehicle 520 to oscillate about a vertical axis, and data captured by the inertial measurement unit during the oscillation of the aerial vehicle 520 about the vertical axis may be used to determine both a period of oscillation of the aerial vehicle 520, and a vector $V_2$ corresponding to the vertical axis of the aerial vehicle 520, with the aerial vehicle 520 in the second orientation. After data has been captured during the oscillation of the aerial vehicle 520 in the second orientation, the process may be repeated by repositioning the aerial vehicle 520 to a third orientation, as is shown in FIG. 5D, by opening the clamp, rotating the aerial vehicle 520 about the pitch axis, and allowing the clamp 552 to travel to a new location within the track 550 before closing the clamp 552 in the new location within the track 550 and allowing the aerial vehicle 520 to be suspended therefrom. Data captured by the inertial measurement unit during the oscillation of the aerial vehicle 520 about the vertical axis may be used to determine a period of oscillation of the aerial vehicle 520, and a vector $V_3$ corresponding to the vertical axis of the aerial vehicle 520, with the aerial vehicle 520 in the third orientation.

As is discussed above, the periods of oscillation and the vectors $V_1$, $V_2$, $V_3$ determined by the inertial measurement unit may be used to determine moments of inertia about principal axes of the aerial vehicle 520, and to complete a moment of inertia tensor for the aerial vehicle 520 accordingly, according to one or more of the equations discussed above.

Figure 6:
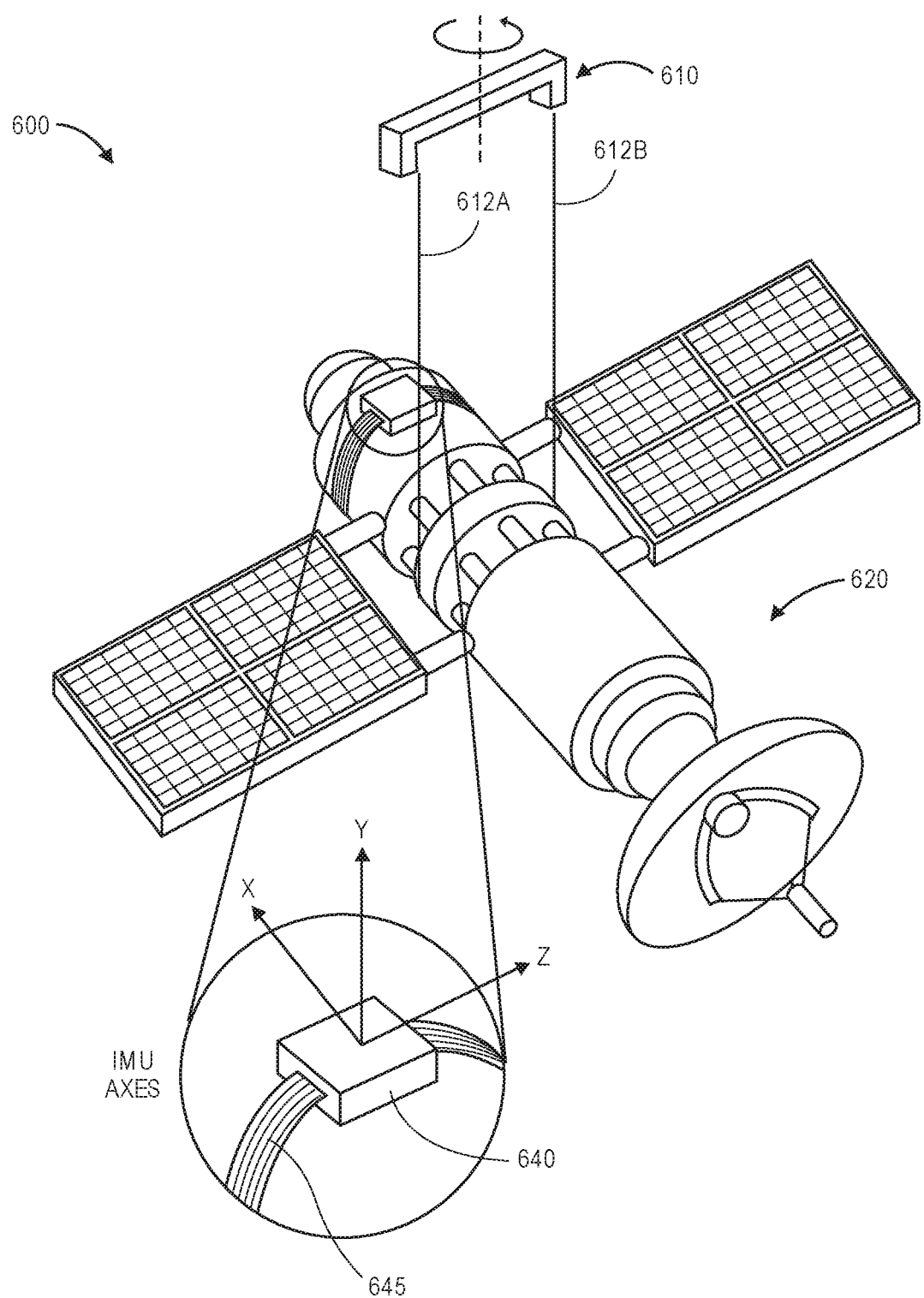
FIG. 6 is a view of aspects of one system for calculating a moment of inertia tensor in accordance with embodiments of the present disclosure.

As is also discussed above, the systems and methods of the present disclosure may be used to determine moment of inertia values for any object based on data captured using an inertial measurement unit, and are not limited to aerial vehicles. Additionally, the inertial measurement unit may be installed or embedded within the object, or, alternatively, affixed to one or more surfaces of the object, e.g., using one or more fastening or attachment mechanisms such as such as straps, bolts, pins, screws, clamps or others, and need not be installed or embedded within the object. Referring to FIG. 6, a view of aspects of one system for calculating a moment of inertia tensor in accordance with embodiments of the present disclosure is shown. Except where otherwise noted, reference numerals preceded by the number "6" shown in FIG. 6 indicate components or features that are similar to components or features having reference numerals preceded by the number "5" shown in FIGS. 5A through 5D, by the number "4" shown in FIGS. 4A through 4D or by the number "2" in FIG. 2 or by the number "1" shown in FIGS. 1A through 1G.

As is shown in FIG. 6, a satellite 620 is suspended by a testing unit 610, viz., by way of a pair of filars 612A, 612B of equal length that are aligned in parallel with one another. The filars 612A, 612B may be directly connected to the satellite 620 or, alternatively, connected to the satellite 620 by way of one or more mounting units, e.g., the mounting unit 115 of FIG. 1A or the mounting unit 515 of FIG. 5A. An inertial measurement unit 640 is attached to an external surface of the satellite 620 by way of a strap 645 or other fastening or attachment mechanism. In accordance with some embodiments of the present disclosure, an initial rotation may be imparted upon the satellite 620 by a force and/or a torque, and the satellite 620 may be caused to oscillate about a vertical axis. The inertial measurement unit 640 may capture data during the oscillation of the satellite 620 about the vertical axis, and a period of oscillation and a vector corresponding to the vertical axis may be determined from such data. From the period of oscillation and the vector corresponding to the vertical axis, a moment of inertia of the satellite in the frame of the inertial measurement unit 640 may be determined. The process may be repeated a predetermined number of times, e.g., three, four, five or six times, or more times, by reorienting the satellite 620 and suspending the satellite 620 from the testing unit 610 by the filars 612A, 612B, before imparting another initial rotation onto the satellite 620 by one or more forces or torques. Data captured by the inertial measurement unit 640 during such oscillations may be used to determine periods of oscillation and vectors corresponding to vertical axes of the satellite 620 in such orientations. Moreover, to the extent that any aspects of the satellite 620 are retractable or otherwise configured to change in its orientations, such as solar panels and/or antennae, the process may be repeated any number of times with such aspects in a variety of orientations, e.g., with solar panels, antennae or other aspects extended or retracted to any predetermined extents.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, one or more of the embodiments of the present disclosure may be utilized as a primary system or method for determining values of moments of inertia or a moment of inertia tensor for an object or, alternatively, in concert with other systems or methods, e.g., as a secondary or backup system or method, for determining moments of inertia or a moment of inertia tensor for the object. For example, where a moment of inertia tensor is estimated for an object, or for a representative one of a plurality of objects, based on geometric features, dimensions or other aspects of the object, individual values of the moment of inertia tensor may be calculated to check or verify such estimations for the object, or for the representative one of the plurality of objects, and to confirm that such estimations are accurate for the object or for each of the plurality of objects accordingly.

Additionally, combinations, features or aspects of one or more of the embodiments discussed or described herein may be utilized in concert with any of the other embodiments discussed or described herein, even if such features or aspects are not expressly described herein as being associated with such other embodiments. For example, load cells, such as the load cells 114A, 114B of FIG. 1A, may be utilized in connection with the testing unit 610 and/or the filars 612A, 612B of FIG. 6, or with any of the other systems or methods discussed or described herein.

Moreover, although one or more of the embodiments disclosed herein may reference determining a moment of inertia tensor for an object by imparting rotations upon the object in a predetermined number of orientations, e.g., three, four, five or six, those of ordinary skill in the pertinent arts will recognize that the systems and methods disclosed herein may be utilized to determine values of moment of inertia tensors for any objects by imparting rotations upon such objects in any number of orientations, including but not limited to fewer than two or greater than six orientations.

Although some of the embodiments disclosed herein may reference unmanned aerial vehicles, e.g., for delivering payloads from warehouses or other like facilities to customers or other recipients, those of ordinary skill in the pertinent arts will recognize that the systems and methods disclosed herein are not so limited, and may be utilized to calculate moment of inertia tensors of any type or form of device, system, vehicle, station or other object in general, including any type or form of aerial vehicle (e.g., manned or unmanned) having fixed or rotating wings for any intended industrial, commercial, recreational or other use, as well as any other type or form of land-based, sea-based or air-based vehicle, station or object.

It should be understood that, unless otherwise explicitly or implicitly indicated herein, any of the features, capacities, attributes, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method, comprising:
   releasably coupling an aerial vehicle to a mounting unit in a first orientation, wherein the aerial vehicle comprises an onboard inertial measurement unit having at least one gyroscope and at least one accelerometer, wherein the mounting unit is joined to a first end of a first cable and a first end of a second cable, wherein the first cable and the second cable are substantially parallel with the aerial vehicle releasably coupled to the mounting unit in the first orientation, wherein a second end of the first cable is joined to at least one stable surface, wherein a second end of the second cable is joined to the at least one stable surface, and wherein each of the first cable and the second cable has a common length;
   causing oscillations of the aerial vehicle about a first vertical axis, wherein causing the oscillations comprises imparting an initial angle about the first vertical axis of not more than ten degrees upon the aerial vehicle;
   capturing first data by the onboard inertial measurement unit;
   determining, based at least in part on the first data, a first period of the oscillations;
   calculating a first moment of inertia based at least in part on a mass of the aerial vehicle, a distance between the first cable and the second cable, the first period and the common length;
   determining, based at least in part on the first data, a first vector corresponding to the first vertical axis;
   releasably coupling the aerial vehicle to the mounting unit in a second orientation, wherein the first cable and the second cable are substantially parallel with the aerial vehicle releasably coupled to the mounting unit in the second orientation;
   causing oscillations of the aerial vehicle about a second vertical axis, wherein causing the oscillations comprises imparting an initial angle about the second vertical axis of not more than ten degrees upon the aerial vehicle; capturing second data by the onboard inertial measurement unit; determining, based at least in part on the second data, a second period of the oscillations;
   calculating a second moment of inertia based at least in part on the mass of the aerial vehicle, the distance between the first cable and the second cable, the second period and the common length;
   determining, based at least in part on the second data, a second vector corresponding to the second vertical axis;
   releasably coupling the aerial vehicle to the mounting unit in a third orientation, wherein the first cable and the second cable are substantially parallel with the aerial vehicle releasably coupled to the mounting unit in the third orientation;

causing oscillations of the aerial vehicle about a third vertical axis, wherein causing the oscillations comprises imparting an initial angle about the third vertical axis of not more than ten degrees upon the aerial vehicle;

capturing third data by the onboard inertial measurement unit;

determining, based at least in part on the third data, a third period of the oscillations;

calculating a third moment of inertia based at least in part on the mass of the aerial vehicle, the distance between the first cable and the second cable, the third period and the common length; and calculating a moment of inertia tensor for the aerial vehicle based at least in part on the first moment of inertia, the second moment of inertia, the third moment of inertia, the first vertical axis, the second vertical axis and the third vertical axis.

2. The method of claim 1, further comprising:

a first load cell provided in association with the first cable, wherein the first load cell is configured to calculate a first load signal based at least in part on a first load applied to the first cable; and a second load cell provided in association with the second cable, wherein the second load cell is configured to calculate a second load signal based at least in part on a second load applied to the second cable, and wherein the method further comprises:

calculating the mass of the aerial vehicle based at least in part on the first load signal and the second load signal.

3. The method of claim 1, wherein the first moment of inertia is calculated according to an equation $$I_1 = mgr_1^2 T_1^2 / 4\pi^2 l_1$$

wherein $I_1$ is the first moment of inertia, m is the mass of the aerial vehicle, g is acceleration due to gravity, $r_1$ is one-half of the distance between the first cable and the second cable, $T_1$ is the first period of oscillation, $\pi$ is the constant pi, and $l_1$ is the common length.

4. A method comprising:

suspending an object in a first orientation by a first filar and a second filar, wherein each of the first filar and the second filar has a first length with the object suspended in the first orientation, wherein the first filar and the second filar are substantially parallel with the object suspended in the first orientation, and wherein the first filar and the second filar are separated by a first distance with the object suspended in the first orientation;

causing at least a first oscillation of the object about a first vertical axis of the object with the object suspended in the first orientation;

capturing first data by an inertial measurement unit associated with the object during at least the first oscillation, wherein the inertial measurement unit comprises at least one gyroscope and at least one accelerometer;

determining a first period of the first oscillation based at least in part on the first data;

calculating a first moment of inertia of the object about the first vertical axis based at least in part on the first period of the first oscillation, the first distance, the first length and a mass of the object;

suspending the object in a second orientation by the first filar and the second filar, wherein each of the first filar and the second filar has a second length with the object suspended in the second orientation, wherein the first filar and the second filar are substantially parallel with the object suspended in the second orientation, and wherein the first filar and the second filar are separated by a second distance with the object suspended in the second orientation;

causing at least a second oscillation of the object about a second vertical axis of the object with the object suspended in the second orientation;

capturing second data by the inertial measurement unit during at least the second oscillation;

determining a second period of the second oscillation based at least in part on the second data; and calculating a second moment of inertia of the object about the second vertical axis based at least in part on the second period of the second oscillation, the second distance and the second length.

5. The method of claim 4, wherein the first moment of inertia is calculated according to an equation:

$$I_1 = mgr_1^2 T_1^2 / 4\pi^2 l_1,$$

wherein $I_1$ is the first moment of inertia, m is the mass of the object, g is acceleration due to gravity, $r_1$ is one-half of the first distance, $T_1$ is the first period, $\pi$ is the constant pi, and $l_1$ is the first length.

6. The method of claim 4, further comprising:

determining, by the inertial measurement unit aboard the object, a first vector corresponding to the first vertical axis of the object during at least the first oscillation; and calculating a moment of inertia about at least one axis of a coordinate frame of the inertial measurement unit based at least in part on the first moment of inertia and the first vector.

7. The method of claim 6, wherein at least the first moment of inertia is a product of a moment of inertia transformation matrix of the object and the moment of inertia of the object about the at least one axis of the coordinate frame of the inertial measurement unit, and wherein the moment of inertia transformation matrix of the object is calculated based at least in part on the first vector.

8. The method of claim 4, wherein causing at least the first oscillation of the object about the first vertical axis comprises:

imparting an initial rotation to the object about the first vertical axis, wherein the initial rotation is not greater than approximately ten degrees.

9. The method of claim 4, wherein suspending the object comprises:

releasably coupling a first end of the first filar to a first portion of the object, wherein a second end of the first filar is coupled to a stable surface above the object; and releasably coupling a first end of a second filar to a second portion of the object, wherein a second end of the second filar is coupled to the stable surface above the object, wherein at least the first oscillation of the object about the first vertical axis is caused after releasably coupling the first end of the first filar to the first portion of the object and after releasably coupling the first end of the second filar to the second portion of the object.

10. The method of claim 4, wherein an angle between one of a normal axis of the object, a lateral axis of the object, or a longitudinal axis of the object in the first orientation and the one of the normal axis, the lateral axis or the longitudinal axis of the object in the second orientation is not less than forty-five degrees and not greater than one hundred thirty-five degrees.

11. The method of claim 4, further comprising:
determining, by a first load cell provided in association with the first filar, a first load applied to the first filar; and
determining the mass of the object based at least in part on the first load.

12. The method of claim 4, wherein the object is an aerial vehicle, and
wherein the inertial measurement unit is mounted at a center of gravity of the aerial vehicle.

13. The method of claim 4, wherein the object is an aerial vehicle, and
wherein the first vertical axis is not one of a yaw axis, a pitch axis or a roll axis of the aerial vehicle.

14. The method of claim 4, wherein the inertial measurement unit is coupled to a surface of the object by at least one fastening apparatus.

15. A method comprising:
suspending an object in a first orientation by a first filar and a second filar, wherein each of the first filar and the second filar has a first length with the object suspended in the first orientation, wherein the first filar and the second filar are substantially parallel with the object suspended in the first orientation, and wherein the first filar and the second filar are separated by a first distance with the object suspended in the first orientation;
causing at least a first oscillation of the object about a first vertical axis of the object with the object suspended in the first orientation;
capturing first data by an inertial measurement unit associated with the object during at least the first oscillation, wherein the inertial measurement unit comprises at least one gyroscope and at least one accelerometer;
determining a first period of the first oscillation based at least in part on the first data;
calculating a first moment of inertia of the object about the first vertical axis based at least in part on the first period of the first oscillation, the first distance, the first length and a mass of the object;
suspending the object in a second orientation from the first end of the first filar and the second end of the second filar, wherein each of the first filar and the second filar has a second length with the object suspended in the second orientation, wherein the first filar and the second filar are substantially parallel with the object suspended in the second orientation, and wherein the first filar and the second filar are separated by a second distance with the object suspended in the second orientation;
imparting a second movement to the object, wherein the second movement causes at least a second oscillation of the object about a second vertical axis of the object with the object in the second orientation;
determining, by the inertial measurement unit, a second period of the second oscillation;
calculating a second moment of inertia of the object about the second vertical axis based at least in part on the second period of the second oscillation, the second distance and the second length;
suspending the object in a third orientation from the first end of the first filar and the second end of the second filar, wherein each of the first filar and the second filar has a third length with the object suspended in the third orientation, wherein the first filar and the second filar are substantially parallel with the object suspended in the third orientation, and wherein the first filar and the second filar are separated by a third distance with the object suspended in the third orientation;
imparting a third movement to the object, wherein the third movement causes at least a third oscillation of the object about a third vertical axis of the object with the object in the third orientation;
determining, by the inertial measurement unit, a third period of the third oscillation; and
calculating a third moment of inertia of the object about the third vertical axis based at least in part on the third period of the third oscillation, the third distance and the third length.

16. A method comprising:
suspending an aerial vehicle from a first filar and a second filar in a predetermined number of discrete orientations, wherein the first filar and the second filar have equal lengths with the aerial vehicle suspended in each of the discrete orientations, and wherein the first filar and the second filar are in parallel and separated by a predetermined distance with the aerial vehicle suspended in each of the discrete orientations;
causing, with the aerial vehicle suspended from the first filar and the second filar in each of the discrete orientations, at least one oscillation of the aerial vehicle about a vertical axis;
capturing data by an inertial measurement unit provided aboard the aerial vehicle during the at least one oscillation of the aerial vehicle about the vertical axis with the aerial vehicle suspended from the first filar and the second filar in each of the discrete orientations, wherein the inertial measurement unit comprises at least one gyroscope and at least one accelerometer;
calculating a period of the at least one oscillation of the aerial vehicle about the vertical axis with the aerial vehicle suspended from the first filar and the second filar in each of the discrete orientations based at least in part on the data captured by the inertial measurement unit during the at least one oscillation of the aerial vehicle about the vertical axis;
determining, for each of the discrete orientations, a vector corresponding to a vertical axis with the aerial vehicle suspended from the first filar and the second filar in each of the discrete orientations;
calculating, for each of the discrete orientations, a moment of inertia of the aerial vehicle about the vertical axis based at least in part on a mass of the aerial vehicle, the predetermined distance, the period and the equal lengths of the first filar and the second filar with the aerial vehicle suspended from the first filar and the second filar in each of the discrete orientations; and
calculating a moment of inertia tensor for the aerial vehicle based at least in part on each of the moments of inertia of the aerial vehicle about the vertical axes and each of the vectors corresponding to the vertical axes.

17. The method of claim 16, wherein causing the at least one oscillation of the aerial vehicle about the vertical axis with the aerial vehicle suspended from the first filar and the second filar in each of the discrete orientations comprises:
imparting an initial rotation to the aerial vehicle about the vertical axis with the aerial vehicle suspended from the first filar and the second filar in each of the discrete orientations, wherein each of the initial rotations is not greater than approximately ten degrees.

18. The method of claim 16, wherein the predetermined number is six.

19. The method of claim 15, wherein the object is an aerial vehicle, and
wherein the inertial measurement unit is mounted at a center of gravity of the aerial vehicle.

20. The method of claim 15, further comprising:
determining, by a first load cell provided in association with the first filar, a first load applied to the first filar with the object suspended in at least one of the first orientation, the second orientation or the third orientation;
determining, by a second load cell provided in association with the second filar, a second load applied to the second filar with the object suspended in the at least one of the first orientation, the second orientation or the third orientation; and
determining the mass of the object based at least in part on the first load and the second load.

* * * * *